US010792873B2

(12) United States Patent
Pillay et al.

(10) Patent No.: US 10,792,873 B2
(45) Date of Patent: Oct. 6, 2020

(54) FASTENING DEVICES FOR LANDING STRING BUOYANCY AND OTHER SOLUTIONS

(71) Applicant: THE UAB RESEARCH FOUNDATION, Birmingham, AL (US)

(72) Inventors: Selvum Pillay, Birmingham, AL (US); Haibin Ning, Birmingham, AL (US)

(73) Assignee: THE UAB RESEARCH FOUNDATION, Birmingham, AL (US)

( * ) Notice: Subject to any disclaimer, the term of this patent is extended or adjusted under 35 U.S.C. 154(b) by 112 days.

(21) Appl. No.: 15/712,867

(22) Filed: Sep. 22, 2017

(65) Prior Publication Data

US 2018/0086012 A1   Mar. 29, 2018

Related U.S. Application Data

(60) Provisional application No. 62/398,736, filed on Sep. 23, 2016.

(51) Int. Cl.
  *F16B 33/00*    (2006.01)
  *B29D 1/00*     (2006.01)
  (Continued)

(52) U.S. Cl.
  CPC .......... *B29D 1/005* (2013.01); *B29C 48/0011* (2019.02); *E21B 17/012* (2013.01); *E21B 17/042* (2013.01); *F16B 33/006* (2013.01); *B29K 2077/00* (2013.01); *B29K 2081/04* (2013.01); *B29K 2309/08* (2013.01); *B29L 2001/002* (2013.01); *B29L 2001/005* (2013.01); *F16B 33/00* (2013.01)

(58) Field of Classification Search
  CPC ........ F16B 33/00; F16B 33/006; F16B 33/02; F16B 41/002
  USPC .............. 411/337, 366.1, 424, 432, 904, 908
  See application file for complete search history.

(56) References Cited

U.S. PATENT DOCUMENTS 2,936,186 A * 5/1960 Dunmire ............... F16L 21/005
                                                    285/373
3,006,663 A * 10/1961 Bowne ................ F16L 27/1133
                                                    285/233

(Continued)

OTHER PUBLICATIONS

Poster at Offshore Technology Conference (Oct. 2013).

*Primary Examiner* — Roberta S Delisle
(74) *Attorney, Agent, or Firm* — Thomas|Horstemeyer, LLP

(57) ABSTRACT

Fastening devices are described. In one example, the fastening devices can be used for a landing string buoyancy solution. The landing string hardware includes a stop collar to be fitted and secured around a drill pipe and stop collar hardware to secure the stop collar together around the drill pipe. The stop collar can be secured at one end of a number of buoyancy modules placed along a longitudinal length of the drill pipe to hold them into place along the drill pipe. The stop collar can be formed from long fiber thermoplastic using extrusion-compression molding. The stop collar hardware includes a bolt having an external thread formed from long fiber thermoplastic and a nut having an internal thread formed from long fiber thermoplastic. Both the stop collar and the stop collar hardware are tested for suitability for the application of holding the buoyancy modules in place under operating conditions.

6 Claims, 18 Drawing Sheets

(51) Int. Cl.
  *E21B 17/042* (2006.01)
  *E21B 17/01* (2006.01)
  *B29C 48/00* (2019.01)
  *B29K 309/08* (2006.01)
  *B29L 1/00* (2006.01)
  *B29K 77/00* (2006.01)
  *B29K 81/00* (2006.01)

(56) References Cited

U.S. PATENT DOCUMENTS

| | | | | |
|---|---|---|---|---|
| 3,741,067 A * | 6/1973 | Moran | | F16B 33/006 411/39 |
| 4,417,755 A * | 11/1983 | Gittleman | | F16L 21/065 285/367 |
| 4,652,023 A * | 3/1987 | Timmons | | F16L 55/172 138/99 |
| 4,788,022 A * | 11/1988 | Sakayori | | B29C 33/123 264/275 |
| 4,790,058 A * | 12/1988 | Miller | | F16L 21/06 138/99 |
| 4,863,330 A * | 9/1989 | Olez | | B29C 70/081 411/424 |
| 5,080,547 A * | 1/1992 | Moghe | | B29C 53/585 156/393 |
| 5,114,290 A * | 5/1992 | Moghe | | B29C 53/585 156/391 |
| 5,152,650 A * | 10/1992 | Kitagawa | | B29C 70/12 411/424 |
| 5,860,779 A * | 1/1999 | Toosky | | F16B 37/122 411/178 |
| 6,367,849 B1 * | 4/2002 | Tatsuta | | F16L 21/06 285/373 |
| 6,799,930 B1 * | 10/2004 | More | | F16B 37/0892 411/433 |
| 7,303,367 B2 * | 12/2007 | Rode | | F16B 39/14 411/246 |
| 7,383,885 B2 | 6/2008 | Bergeron et al. | | |
| 7,950,701 B2 * | 5/2011 | Dole | | F16L 17/04 285/253 |
| 8,105,004 B2 * | 1/2012 | Stephen | | F16B 33/006 411/377 |
| 8,118,528 B2 * | 2/2012 | Herndon | | F16B 37/0892 285/33 |
| 8,172,277 B2 * | 5/2012 | Sarkisyan | | F16L 21/065 285/373 |
| 8,465,241 B2 * | 6/2013 | Gaw | | B29C 70/083 411/424 |
| 8,613,580 B2 * | 12/2013 | Hecht | | F16B 33/006 411/424 |
| 8,794,882 B2 * | 8/2014 | Whaley | | B23G 5/04 408/215 |
| 2002/0106259 A1 * | 8/2002 | Kaufman | | F16B 33/006 411/396 |
| 2005/0116467 A1 * | 6/2005 | Ogawa | | F16B 33/006 285/86 |
| 2008/0240884 A1 * | 10/2008 | Dahners | | B25B 13/485 411/190 |

* cited by examiner (A)

(B)

(C)

FASTENING DEVICES FOR LANDING STRING BUOYANCY AND OTHER SOLUTIONS

CROSS-REFERENCE TO RELATED APPLICATIONS

This application claims the benefit of and priority to U.S. Provisional Application No. 62/398,736, filed Sep. 23, 2016, the entire contents of which is hereby incorporated herein by reference.

BACKGROUND

In the field of offshore drilling, a landing string is composed of a number of interconnected drill pipes which can be used for drilling, landing heavy casing strings in a well, landing heavy equipment on the sea bed, and other uses. The type of drill pipe used in a landing string has a relatively heavy wall (e.g., with a 0.5" or greater pipe wall) and is generally used where regular (e.g., more lightweight) drill pipe does not have sufficient tensile strength. Thus, landing string drill pipes are designed to resist crushing and can be relatively heavy.

BRIEF DESCRIPTION OF THE DRAWINGS

For a more complete understanding of the embodiments and the advantages thereof, reference is now made to the following description, in conjunction with the accompanying figures briefly described as follows.

Figure 1:
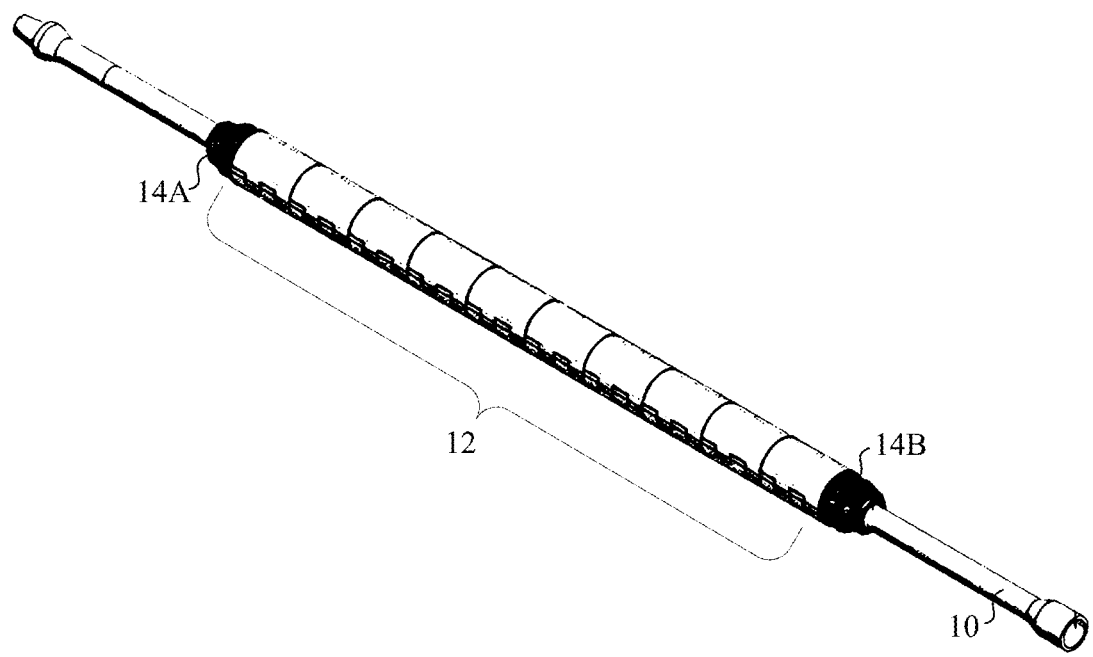
FIG. 1 illustrates an example drill pipe and drill pipe buoyancy solution according to various embodiments described herein.

The drawings illustrate only example embodiments and are therefore not to be considered limiting of the scope of the embodiments described herein, as other embodiments are within the scope of this disclosure. The elements and features shown in the drawings are not necessarily drawn to scale, emphasis instead being placed upon clearly illustrating the principles of the embodiments. Additionally, certain dimensions or positionings may be exaggerated to help visually convey certain principles. In the drawings, similar reference numerals between figures designate like or corresponding, but not necessarily the same, elements.

DETAILED DESCRIPTION

As noted above, a landing string is composed of a number of interconnected drill pipes which can be used for drilling, landing heavy casing strings in a well, landing heavy equipment on the sea bed, and other uses. The type of drill pipe used in a landing string has a relatively heavy wall (e.g., with a 0.5" or greater pipe wall) and is generally used where regular (e.g., more lightweight) drill pipe does not have sufficient tensile strength. Thus, landing string drill pipes are designed to resist crushing and can be relatively heavy.

While buoyancy modules can be attached to the outside of a drilling riser to reduce or eliminate its overall weight in water, the weight of the landing string, which runs inside the drilling riser, is still borne by the drilling rig as it is effectively independent of the drilling riser. The overall drilling depth (water column plus distance to well) is therefore limited by the total load that the rig can carry via the hook.

To effectively reduce the weight of the landing string, the concept of landing string buoyancy (e.g., as described in U.S. Pat. No. 7,383,885) involves the addition of buoyancy modules to landing string drill pipes. The buoyancy modules reduce the overall weight carried by a drilling rig. By adding buoyancy modules to the landing string, the overall depth capabilities can be greatly increased, effectively extending the working capacity of existing vessels with little or no upgrades.

To provide a more robust and safe solution, the following design constraints can be applied to components used in a landing string buoyancy solution: (1) no metallic components to minimize any damage caused by a component falling into the annulus and entering the well, and (2) the amount of 'trap points' for drilling mud should be minimized.

The environment in the annulus between the drill pipe and the drill riser is typically olefin-based drilling fluid or drilling mud. The density of the drilling mud will vary depending upon the drill depth, well characteristics, and other factors. Typical olefin-based drilling fluids that may be suitable are Novaplus® and Rheliant®, both available from MI-Swaco, among others. The typical density range for these types of synthetic muds is between about 8.0-14.0 lb/gal.

Hydrostatic pressure is built up within the drilling mud by virtue of the fact that it will effectively form a 'column' within the drilling annulus. The maximum operating pressure is therefore dependent upon the total length of riser deployed, the drilling rig air gap, and the density of mud used. All the components of any landing string buoyancy solution should thus be able to survive the maximum and minimum temperatures during operations, regardless of service pressure. An example of the operating conditions that all components should be able to survive are given in Error! Reference source not found. below.

TABLE 1

| Operating Environment | Maximum Temperature (° F.) | Minimum Temperature (° F.) | Maximum Pressure (psig) |
|---|---|---|---|
| Olefin-based Drilling Mud | 150 | 36 | 6,000 |
| Atmospheric | 150 | 23 | 0 |

Thus, example performance criteria for a landing string buoyancy solution include the ability to operate effectively in olefin-based drilling mud at temperatures from about 36-80° F. (2-27° C.) and pressures up to a maximum of about 6000 psi (equivalent to >4000 msw/13500 fsw). The complete assembled solution should be suitable for exposure to surface temperatures ranging from 23-150° F. (−5-66° C.), with the assembly hardware able to maintain functionality when mechanically loaded under these conditions.

In the context of the requirements and operating conditions for the landing string buoyancy solutions described above, landing string buoyancy hardware and a method of manufacture thereof is described herein. In one embodiment, the landing string hardware includes a stop collar to be fitted and secured around a drill pipe and stop collar hardware to secure the stop collar together around the drill pipe. The stop collar can be secured at one end of a number of buoyancy modules placed along a longitudinal length of the drill pipe to hold the buoyancy modules into place along the drill pipe. A pair of stop collars can be secured at the two ends of the buoyancy modules along a longitudinal length of the drill pipe to hold the buoyancy modules into place along the drill pipe. In one example, the stop collars and the landing string hardware can be formed from long fiber thermoplastic using extrusion-compression molding. In other examples, the stop collars and the hardware can be formed from other polymers and other fibers using other manufacturing methods, such as injection molding, injection-compression molding, and other suitable molding methods.

The hardware used to secure the stop collars in place on the drill pipe is described as stop collar hardware herein. In one example, the stop collar hardware includes a bolt having an external thread formed from long fiber thermoplastic and a nut having an internal thread formed from long fiber thermoplastic. Both the stop collar and the stop collar hardware have been tested for suitability for the application of holding the buoyancy modules in place under operating conditions.

The buoyancy modules can be embodied as cylindrical half shells assembled around the drill pipe. Each stop collar can be embodied as a single, two-piece collar that can be attached to each end of a string of buoyancy modules to restrain axial and lateral movement of the buoyancy modules. The two halves of each stop collar can be secured around and tensioned upon the drill pipe via the composite stop collar hardware, including bolts, nuts, and in some cases lock or jamb nuts if necessary. In one case, a total of four 1.125" diameter composite bolts, along with matching composite nuts and jamb nuts, can be used to secure the two halves of each stop collar to the drill pipe.

As described in further detail below, composite bolts and nuts can be used to tension the stop collars onto the drill pipe, with sufficient tightening torque specifications to tension the stop collars such that axial motion is prevented under an axial load that is the greater of the initial buoyancy of the lightest density modules or the weight in air of the heaviest density modules. Calculations and testing demonstrate that, once tensioned, the stop collars can withstand the force of 15 buoyancy modules acting in series (e.g., in a string), multiplied by a dynamic amplification factor (DAF) of 2.5 and a safety factor (SF) against slippage of 1.5 without slipping.

During transportation, storage, and handling, the buoyancy modules, stop collars, and composite hardware will be expected to remain in operational and assembled (e.g., fully assembled and torqued) condition on landing string drill pipes. Ultraviolet (UV) exposure and ambient temperatures typical of those expected in deep water conditions can be experienced in such assembled conditions.

Turning to the drawings, FIG. 1 illustrates an example drill pipe 10 and drill pipe buoyancy solution according to various embodiments described herein. The drill pipe buoyancy solution includes a string of buoyancy modules 12 that wrap around the drill pipe 10 and extend along a longitudinal length of the drill pipe 10. The solution also includes stop collars 14A and 14B fitted and secured around the drill pipe 10 at the ends of the string of buoyancy modules 12. The stop collars 14A and 14B secure the string of buoyancy modules 12 in place and prevent them from axial or lateral movement (at least to a suitable extent for the application). As described in further detail below, the stop collars 14A and 14B can be formed from long fiber thermoplastic using extrusion-compression or other molding techniques. A number of the drill pipes 10 can be connected together in series to form a landing string (or part of a landing string) as is understood in the field.

Figure 3:
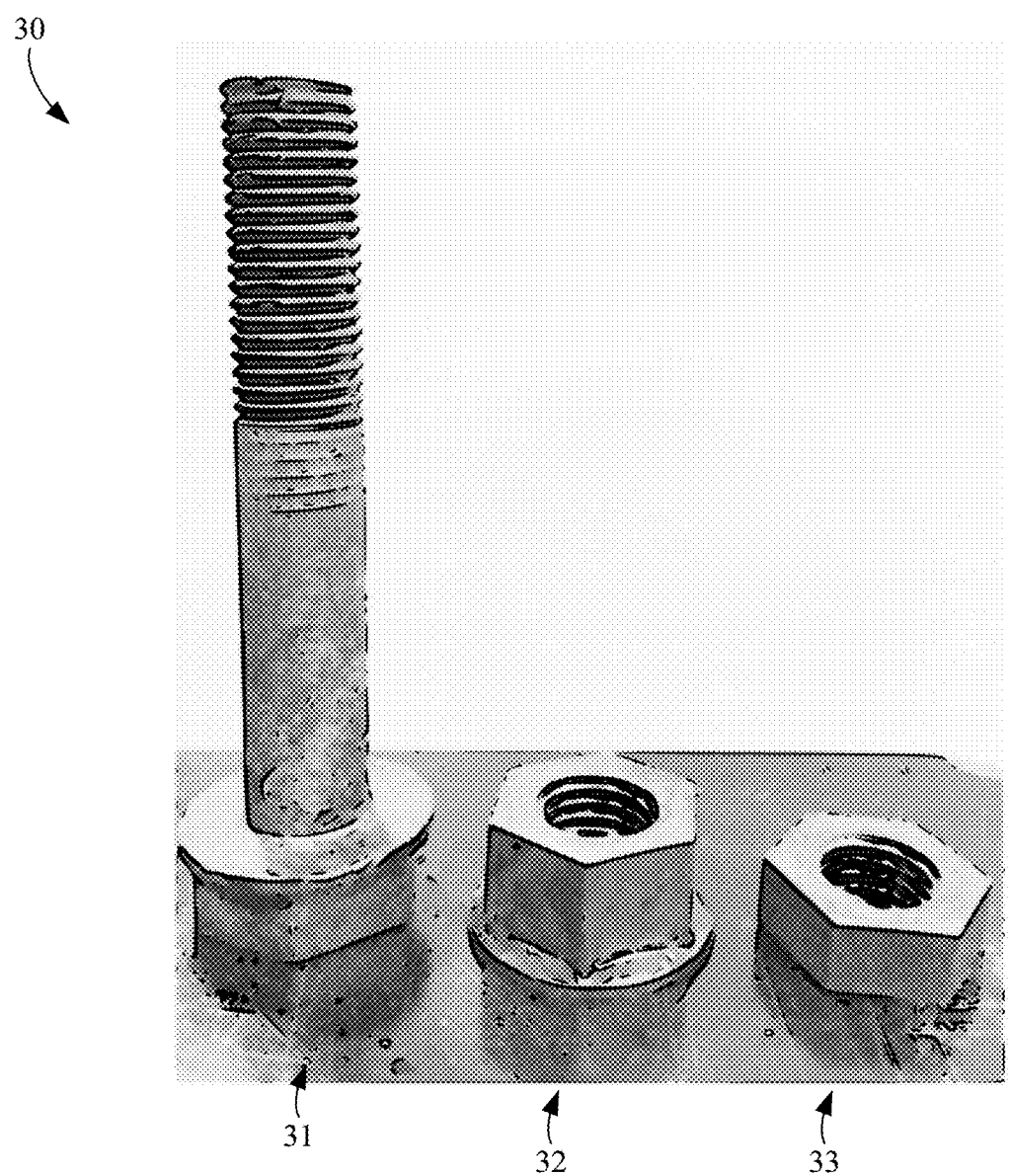
FIG. 3 illustrates example stop collar hardware used to secure the stop collar shown in FIG. 2 according to various embodiments described herein.

Although not visible in FIG. 1 (due to scale), the solution also includes stop collar hardware to secure the stop collars 14A and 14B together around the drill pipe 10. The stop collar hardware includes a number of bolts having an external thread of a predetermined thread lead formed from long fiber thermoplastic and a nut having an internal thread of the predetermined thread lead also formed from long fiber thermoplastic. An example of the stop collar hardware is shown in FIG. 3 and discussed in further detail below. Before turning to the other figures, it is noted that the stop collars 14A and 14B can be used to secure components other than buoyancy modules. Further, the stop collars 14A and 14B can be used to secure components to pipes other than drill pipes.

Figure 2:
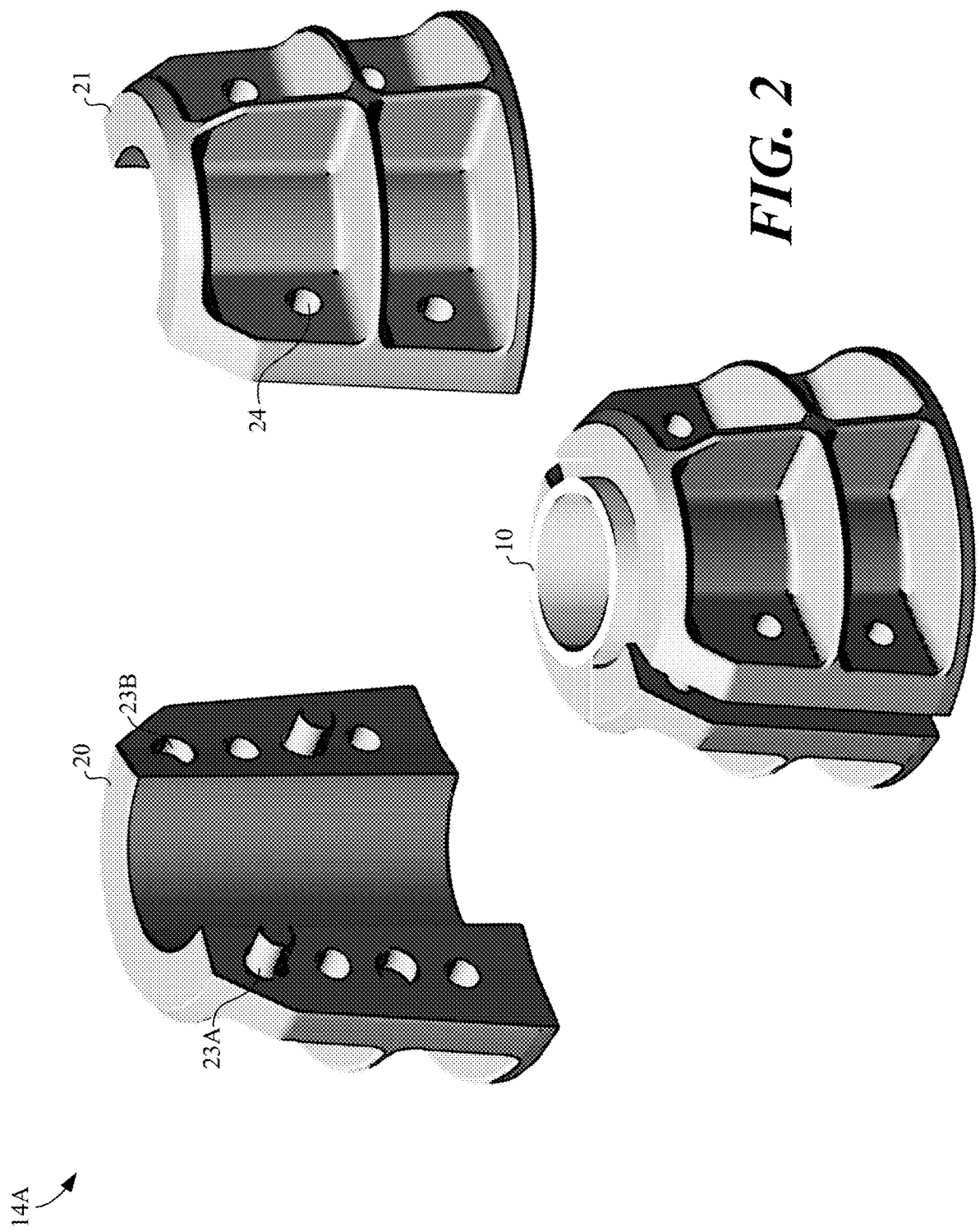
FIG. 2 illustrates an example stop collar shown in FIG. 1 according to various embodiments described herein.

FIG. 2 illustrates an example of the stop collar 14A shown in FIG. 1, and FIG. 3 illustrates an example set of stop collar hardware that can be used to secure the stop collar 14A shown in FIG. 2 around the drill pipe 10 shown in FIG. 1. Referring to FIG. 2, the stop collar 14A is formed as and includes two stop collar halves 20 and 21. Each of the stop collar halves 20 and 21 includes cylindrical pins 23A and corresponding holes 23B for alignment and to prevent (or minimize) over-tightening. The stop collar halves 20 and 21 also include a number of through-holes 24 to pass the stop collar hardware bolts through. The design of the stop collar 14A shown in FIG. 2 is provided as a representative example of a collar suitable to secure buoyancy modules on drill pipe and other designs are within the scope of the embodiments.

Referring to FIG. 3, a set of the stop collar hardware 30 includes a composite bolt 31, a composite nut 32, and a composite lock or jamb nut 33. For the stop collar 14A shown in FIG. 2, four sets of the stop collar hardware 30 shown in FIG. 3 can be used to secure the stop collar 14A around the drill pipe 10. Similarly, four sets of stop collar hardware 30 can be used to secure the stop collar 14B around the drill pipe 10. The stop collar hardware 30 has applications outside the field of offshore drilling. For example, because of the relatively low weight and high strength (and other advantages) of the composite bolt 31, composite nut 32, and composite lock or jamb nut 33, they can be especially suitable for use in the automotive, aeronautic, aerospace, and nautical fields, among others.

During installation and operation, the string of buoyancy modules 12 will experience external loadings due to the relative movement of raising and lowering the drill pipes 10 in the olefin mud and the buoyancy created by the string of buoyancy modules 12. Axial loads will be passed from the string of buoyancy modules 12 to the stop collars 14A and 14B. The coefficient of friction between the stop collars 14A and 14B and the drill pipe 10 can vary based on the type of material from which the stop collars 14A and 14B are formed. Thus, as described in further detail below, various prototypes of the the stop collars 14A and 14B the stop collar hardware 30 formed from different materials were tested for the suitability of holding buoyancy modules in place under operating conditions. The results of the testing is applicable to both the stop collars 14A and 14B shown in FIG. 2 and the stop collar hardware 30 shown in FIG. 3 as well as to other, similar types (e.g., shapes, styles, sizes, etc.) of collars and hardware for the same and other purposes. Thus, the references made below to stop collars and stop collar hardware are not necessarily limited to any particular type or style of collar or hardware such as the examples shown in FIGS. 1-3.

Testing a prototype polyurethane stop collar has confirmed that 162.7 N-m of bolt torque per bolt, for example, can provide sufficient normal force to prevent slippage at the required axial load. Table 2 below provides an example of the axial load requirement and the estimated upper bolt tension value that could be generated.

TABLE 2

Example Load, Torque, and Tension Requirements

| | |
|---|---|
| Minimum axial slip load for stop collar (kN)[1] | 39.03 |
| Bolt torque per bolt (N-m)[2] | 162.7 |
| Bolt tension per bolt (kN)[3] | 38.5 |

[1]Calculated using 15 lowest density modules in 15 lb/gal olefin- based drill mud including SF and DAF.
[2]Measured torque at which slip load requirement was met.
[3]Calculated upper bound of possible tension generated by 120 lbf-ft torque, per API 6A with estimated thread friction. Actual required bolt tension to satisfy minimum slip load must be re-calculated or confirmed experimentally if friction coefficient changes.

Exact values of the frictional coefficient at the threads of the bolt and nut is unknown. Thus, only the upper bound of the bolt tension is specified. Likewise, the friction coefficient between the stop collar and drill pipe has not been established, so experimental testing was used to demonstrate adequacy. During the evaluation of the stop collar, steel bolts and nuts were used for the slip test.

One initial material selected for the stop collar was castable glass filled polyurethane. The material was evaluated for the application of the stop collar and found to be deficient with respect to certain mechanical properties, especially environmental conditions. A bulk molding compound (BMC) material of unknown composition was also evaluated and found to be unsuitable for the application with respect to its mechanical properties.

The following materials for the stop collar were evaluated for the application: 50% long glass fiber reinforced polypropylene (PPGL50), 50% long glass fiber filled nylon 6,6 (PA66GL50), and 40% thermoplastic polyurethane (TPUGL40). The stop collars can also be formed from other long fiber thermoplastic (LFT) materials formed by hot melt-impregnating continuous reinforcing fiber into a thermoplastic resin. The mixture can be cooled and formed (e.g., chopped) into discontinuous reinforcing fiber pellets. The amount of thermoplastic resin can be about 40 to 99 weight % of the LFT material, and the amount of continuous reinforcing fiber (once cut into the discontinuous reinforcing fiber) can be approximately 0.1 to 60 weight % of the LFT material. Example thermoplastic resins include polyamide, acrylonitrile butadiene styrene (ABS), polyphenylene sulfide, polypropylene, poly ether ether ketone, poly ether ketone, polyethylene, poly butylene terephthalate, poly ethylene terephthalate, polyoxymethylene, or combinations thereof. Example reinforcing fibers include carbon, glass, aramid, polypropylene, polyethylene, basalt, poly{diimidazo pyridinylene (dihydroxy) phenylene}, or combinations thereof.

As part of the evaluation, 6"×6" plates were manufactured using extrusion-compression molding (ECM) techniques, although other molding techniques can be used. The plates were used to prepare samples for tension (ASTM D638), flexure (ASTM D790), and impact testing at room and elevated (150° F.) temperature for both the as-manufactured and exposed conditions. Due to the cost and timing of conditioning the samples, the PPGL50 material was exposed first, followed by the PA66GL50 material. The TPUGL40 material was not conditioned.

The test samples were exposed to pressurized synthetic (olefin) based mud (SBM) at 6000 psi at the maximum service temperature, followed by the testing described herein. The exposure was cyclic, consisting of 14 cycles to pressure and temperature, each cycle having a 24 hour duration according to the cycle profile for a single aging cycle shown in FIG. 4.

Tensile testing was conducted according to ASTM D638—Standard Test Methods for Tensile Properties of Plastics. Samples were prepared according to the specification mentioned in the standard. The samples were cut from the test plaques into rectangular beams that were then routed to dog-bone shaped test specimens. First, the rectangular beams were cut with the help of a water cooled tile saw equipped with a diamond blade. The rectangular beams were then routed to dog-bone shaped specimens with a router.

Figure 5:
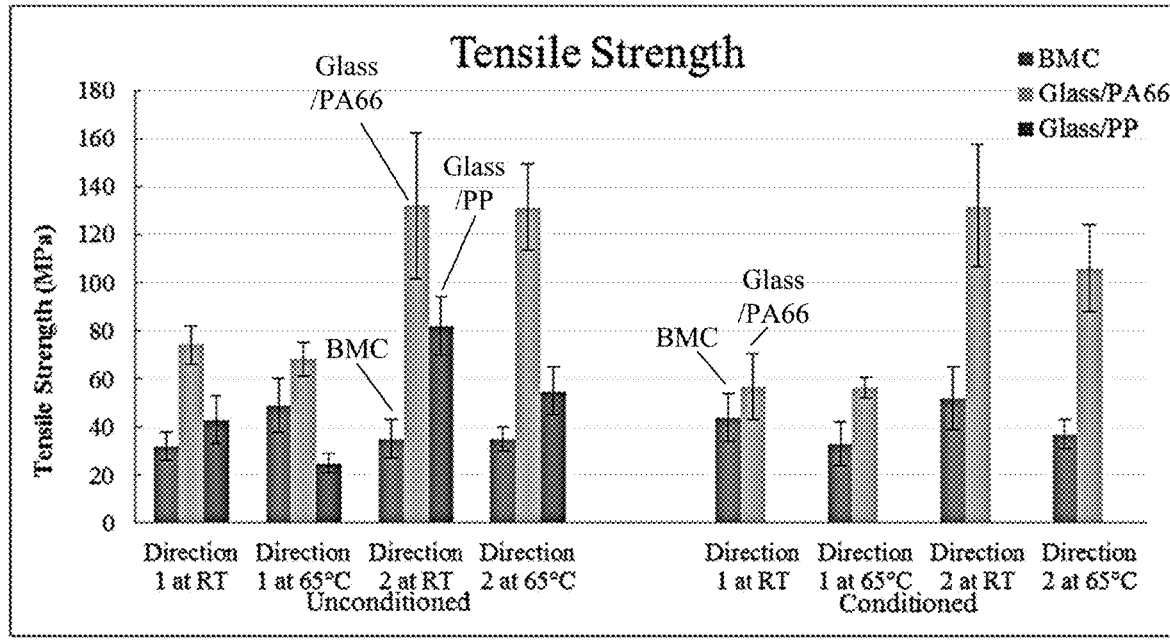
FIGS. 5 and 6 illustrate tensile strength and modulus test results for various plate samples according various embodiments described herein.
Figure 6:
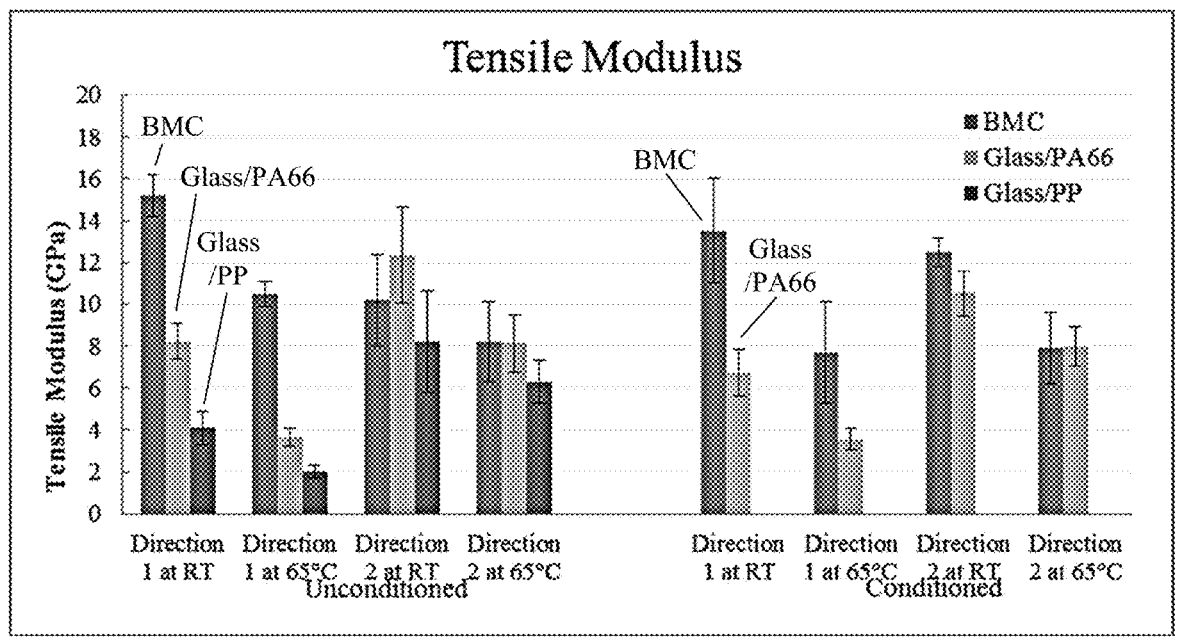

The samples were prepared in two directions, namely transverse and longitudinal (to the direction of material flow). A number of the samples were conditioned and the rest tested at room and elevated temperatures. The elevated temperature tests were performed by testing the samples at 65° C. (150° F.) environment. All tensile tests were conducted on a SATEC™ load frame equipped with a 50,000 lbs-force load cell and a one inch gauge extensometer to measure the strain data. The tests were conducted on displacement control mode with a rate of 2 mm/min. Time (msec), load (Newtons), displacement (mm), and strain (mm/mm) were the variables measured for each of the tests. Results of the testing are shown in Table 6-1 through Table 6-5 for various materials. Bar charts are also shown in FIGS. 5 and 6 for comparative purposes.

TABLE 6-1

Glass/PA66 Unconditioned Plate Tensile Samples

| Description | Strength (MPa) | std dev | Tensile Modulus (GPa) | std. dev |
|---|---|---|---|---|
| Direction 1 at RT | 74.1 | 7.9 | 8.2 | 0.8 |
| Direction 1 at 65° C. | 68.2 | 6.9 | 3.6 | 0.4 |
| Direction 2 at RT | 132.2 | 30.5 | 12.4 | 2.3 |
| Direction 2 at 65° C. | 131.5 | 17.9 | 8.1 | 1.4 |

TABLE 6-2

Glass/PA66 Conditioned Plate Tensile Samples

| Description | Strength (MPa) | std dev | Tensile Modulus (GPa) | std. dev |
|---|---|---|---|---|
| Direction 1 at RT | 56.8 | 13.8 | 6.8 | 1.1 |
| Direction 1 at 65° C. | 56.4 | 4.2 | 3.6 | 0.5 |
| Direction 2 at RT | 131.9 | 25.5 | 10.5 | 1.1 |
| Direction 2 at 65° C. | 106.0 | 18.0 | 8.0 | 0.9 |

TABLE 6-3

Glass/PP Unconditioned Plate Tensile Samples

| Description | Strength (MPa) | std dev | Tensile Modulus (GPa) | std. dev |
|---|---|---|---|---|
| Direction 1 at RT | 43.0 | 10.0 | 4.1 | 0.8 |
| Direction 1 at 65° C. | 25.0 | 4.0 | 2.0 | 0.3 |
| Direction 2 at RT | 82.0 | 12.0 | 8.2 | 2.4 |
| Direction 2 at 65° C. | 55.0 | 10.0 | 6.3 | 1.0 |

TABLE 6-4

BMC Unconditioned Plate Tensile Samples

| Description | Strength (MPa) | std dev | Tensile Modulus (GPa) | std. dev |
|---|---|---|---|---|
| Direction 1 at RT | 32.0 | 6.0 | 15.2 | 1.0 |
| Direction 1 at 65° C. | 49.0 | 11.0 | 10.5 | 0.6 |
| Direction 2 at RT | 35.0 | 8.0 | 10.2 | 2.2 |
| Direction 2 at 65° C. | 35.0 | 5.0 | 8.2 | 1.9 |

TABLE 6-5

BMC Conditioned Plate Tensile Samples

| Description | Strength (MPa) | std dev | Tensile Modulus (GPa) | std. dev |
|---|---|---|---|---|
| Direction 1 at RT | 44.0 | 10.0 | 13.5 | 2.5 |
| Direction 1 at 65° C. | 33.0 | 9.0 | 7.7 | 2.4 |
| Direction 2 at RT | 52.0 | 13.0 | 12.5 | 0.7 |
| Direction 2 at 65° C. | 37.0 | 6.0 | 7.9 | 1.7 |

Figure 7:
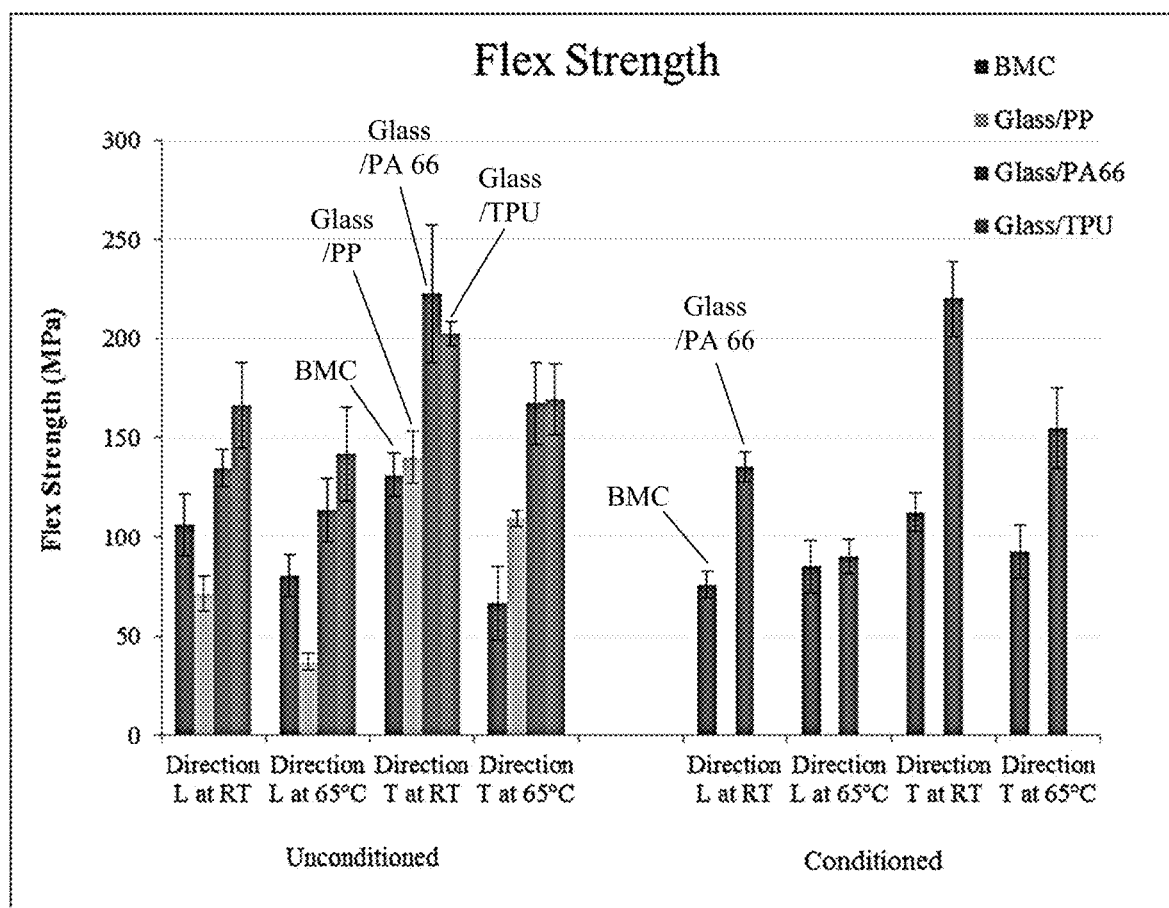
FIGS. 7 and 8 illustrate flexural strength and modulus test results for various plate samples according various embodiments described herein.
Figure 8:
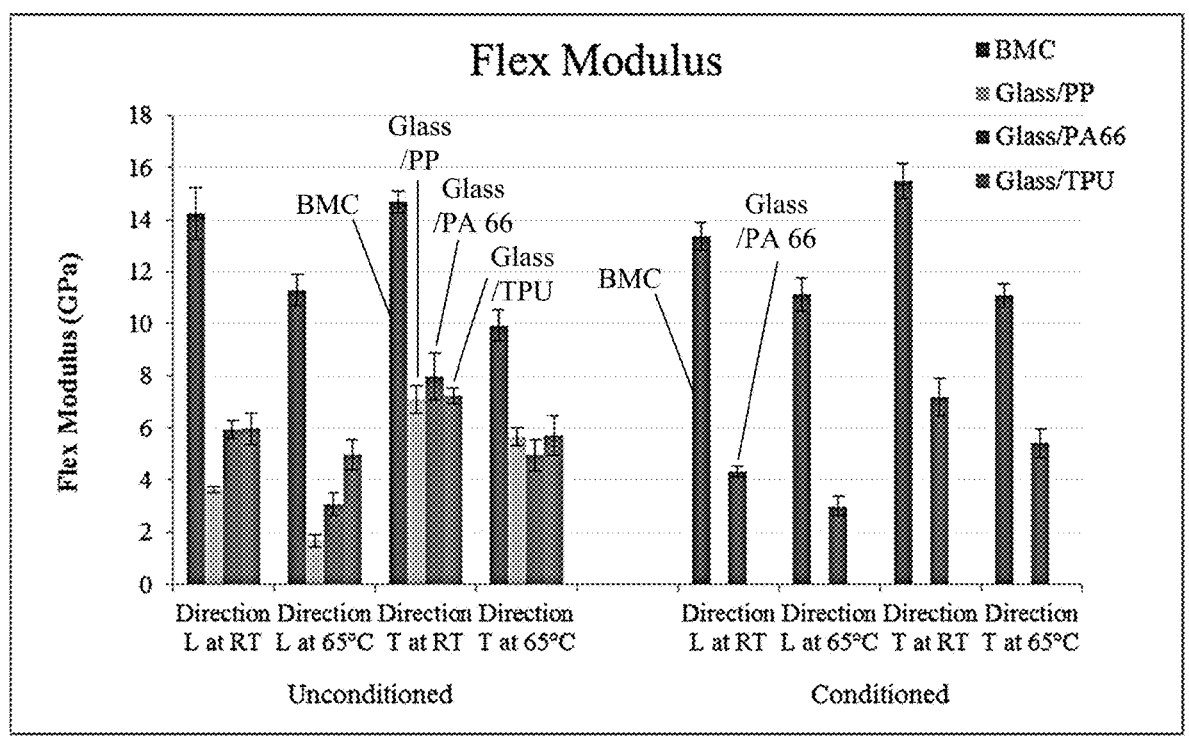

Flexural testing was also conducted according to ASTM 790—Standard Test Methods for Flexural Properties of Unreinforced and Reinforced Plastics and Electrical Insulating Materials. Samples were prepared with the dimensions specified in the standard. Half of the samples were tested as unconditioned and the other half were conditioned prior to the flexural test. The BMC samples were prepared in two directions, Direction 1 and Direction 2. Each direction was tested under room temperature and 65° C. (150° F.). At least five samples were tested for each category. The span length for the flexural testing was 120 mm and the loading rate 5 mm/min. Results are shown in Table 6-6 through Table 6-9 for respective materials. Bar charts are shown in FIG. 7 and FIG. 8 for comparative purposes.

TABLE 6-6

Flexure Results for BMC Plate Samples

| | Description | Strength (MPa) | Stdev | Modulus (GPa) | Stdev |
|---|---|---|---|---|---|
| BMC Unconditioned | Direction 1 at RT | 106.1 | 15.5 | 14.23 | 0.98 |
| | Direction 1 at 65° C. | 80.5 | 10.7 | 11.29 | 0.60 |
| | Direction 2 at RT | 131.4 | 11.1 | 14.68 | 0.42 |
| | Direction 2 at 65° C. | 66.3 | 18.6 | 9.92 | 0.59 |
| BMC Conditioned | Direction 1 at RT | 75.8 | 6.9 | 13.36 | 0.51 |
| | Direction 1 at 65° C. | 85.1 | 13.4 | 11.13 | 0.64 |
| | Direction 2 at RT | 112.7 | 9.7 | 15.49 | 0.66 |
| | Direction 2 at 65° C. | 92.4 | 13.5 | 11.09 | 0.47 |

TABLE 6-7

Flexure Results for Glass/PP Plate Samples

| | Description | Strength (MPa) | Stdev | Modulus (GPa) | Stdev |
|---|---|---|---|---|---|
| Glass/PP Unconditioned | Direction L at RT | 71.1 | 8.7 | 3.63 | 0.1 |
| | Direction L at 65° C. | 37.0 | 4.1 | 1.68 | 0.2 |
| | Direction T at RT | 140.3 | 13.3 | 7.09 | 0.5 |
| | Direction T at 65° C. | 109.5 | 4.1 | 5.67 | 0.3 |

TABLE 6-8

Flexure Results for TPU Sample Plates

| | Description | Strength (MPa) | Stdev | Modulus (GPa) | Stdev |
|---|---|---|---|---|---|
| TPU Unconditioned | Direction L at RT | 166.4 | 21.8 | 5.98 | 0.60 |
| | Direction L at 65° C. | 142.0 | 23.6 | 4.96 | 0.56 |
| | Direction T at RT | 202.5 | 6.0 | 7.23 | 0.31 |
| | Direction T at 65° C. | 169.3 | 17.8 | 5.70 | 0.77 |

TABLE 6-9

Flexure Results for Glass/PA66 Plate Samples

| | Description | Strength (MPa) | Stdev | Modulus (GPa) | Stdev |
|---|---|---|---|---|---|
| Glass/PA66 Unconditioned | Direction L at RT | 134.8 | 9.3 | 5.9 | 0.4 |
| | Direction L at 65° C. | 113.6 | 16.0 | 3.1 | 0.4 |
| | Direction T at RT | 222.6 | 35.1 | 8.0 | 0.9 |
| | Direction T at 65° C. | 167.5 | 20.6 | 5.0 | 0.6 |
| Glass/PA66 Conditioned | Direction L at RT | 135.4 | 7.6 | 4.3 | 0.2 |
| | Direction L at 65° C. | 90.3 | 8.8 | 3.0 | 0.4 |
| | Direction T at RT | 220.0 | 19.0 | 7.2 | 0.7 |
| | Direction T at 65° C. | 155.0 | 20.2 | 5.4 | 0.5 |

Figure 9:
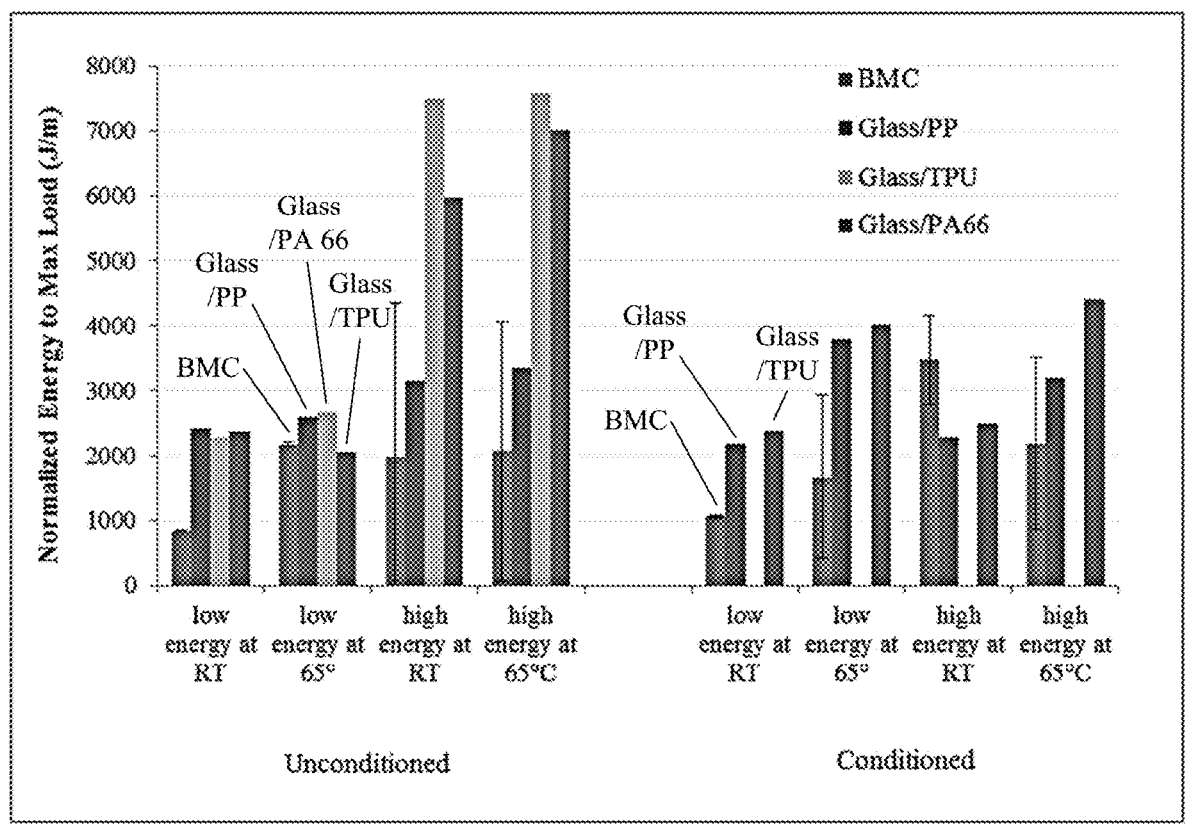
FIGS. 9 and 10 illustrate normalized energy to max load test results for various plate samples according various embodiments described herein.
Figure 10:
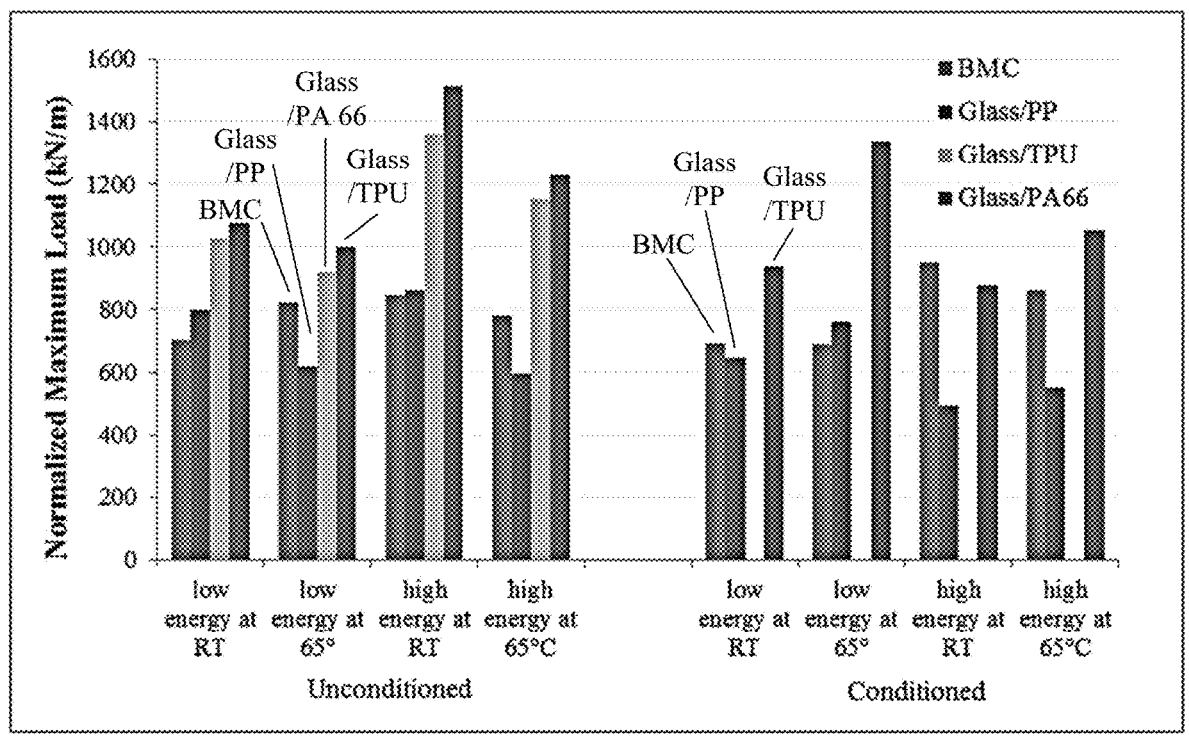

Low velocity impact (LVI) testing was conducted using an instrumented drop weight impact tower. The instrument measures impact force and energy as a function of time. The force-time or energy-time curves convey information pertaining to response of the sample to impact. A 100×100 mm (4"×4") sample is held in a fixture with a 76 mm (3") diameter circular opening. The impact weight is 6.15 kg and the impactor has a 16 mm (⅝") diameter hemispherical tip. Two heights were used to obtain different impact energy levels, 18 and 60 joule, respectively. The energy to maximum load and the peak force for the various materials are shown in the tables that follow. The values are normalized with respect to sample thickness. Comparative bar graphs for the different materials tested are shown in FIGS. 9 and 10. Data are contained in Table 6-10 through Table 6-13 for various materials.

TABLE 6-10

LVI Results for Glass/PP Plate Samples

| | Description | Avg E/t (J/m) | Avg F/t (kN/m) |
|---|---|---|---|
| Unconditioned glass/PP | low energy at RT | 2431 | 801 |
| | low energy at 65° C. | 2593 | 618 |
| | high energy at RT | 3145 | 859 |
| | high energy at 65° C. | 3350 | 595 |
| Conditioned glass/PP | low energy at RT | 2194 | 646 |
| | low energy at 65° | 3788 | 760 |
| | high energy at RT | 2279 | 494 |
| | high energy at 65° C. | 3193 | 549 |

TABLE 6-11

LVI Results for Glass/TPU Plate Samples

| | Description | Avg E/t (J/m) | Avg F/t (kN/m) |
|---|---|---|---|
| Unconditioned glass/TPU | low energy at RT | 2278 | 1026 |
| | low energy at 65° C. | 2674 | 919 |
| | high energy at RT | 7489 | 1360 |
| | high energy at 65° C. | 7572 | 1151 |

TABLE 6-12

LVI Results for Glass/PA66 Plate Samples

| | Description | Avg E/t (J/m) | Avg F/t (kN/m) |
|---|---|---|---|
| Unconditioned glass/PA66 | low energy at RT | 2369 | 1075 |
| | low energy at 65° | 2061 | 999 |
| | high energy at RT | 5976 | 1515 |
| | high energy at 65° C. | 7003 | 1230 |
| Conditioned glass/PA66 | low energy at RT | 2392 | 937 |
| | low energy at 65° | 4013 | 1335 |
| | high energy at RT | 2504 | 875 |
| | high energy at 65° C. | 4405 | 1053 |

TABLE 6-13

LVI Results for BMC Plate Samples

| | Description | Avg E/t (J/m) | Avg F/t (kN/m) |
|---|---|---|---|
| Unconditioned BMC | low energy at RT | 841 | 705 |
| | low energy at 65° | 2174 | 824 |
| | high energy at RT | 1983 | 846 |
| | high energy at 65° C. | 2070 | 780 |
| Conditioned BMC | low energy at RT | 1055 | 693 |
| | low energy at 65° | 1671 | 690 |
| | high energy at RT | 3471 | 948 |
| | high energy at 65° C. | 2192 | 860 |

To further analyze stop collar designs, a solid model of a prototype stop collar was constructed. Half of the assembly was used for finite element analysis as outlined in the APPENDIX attached to U.S. Provisional Application No. 62/398,736, filed Sep. 23, 2016, the entire contents of which is hereby incorporated herein by reference.

Figure 11:
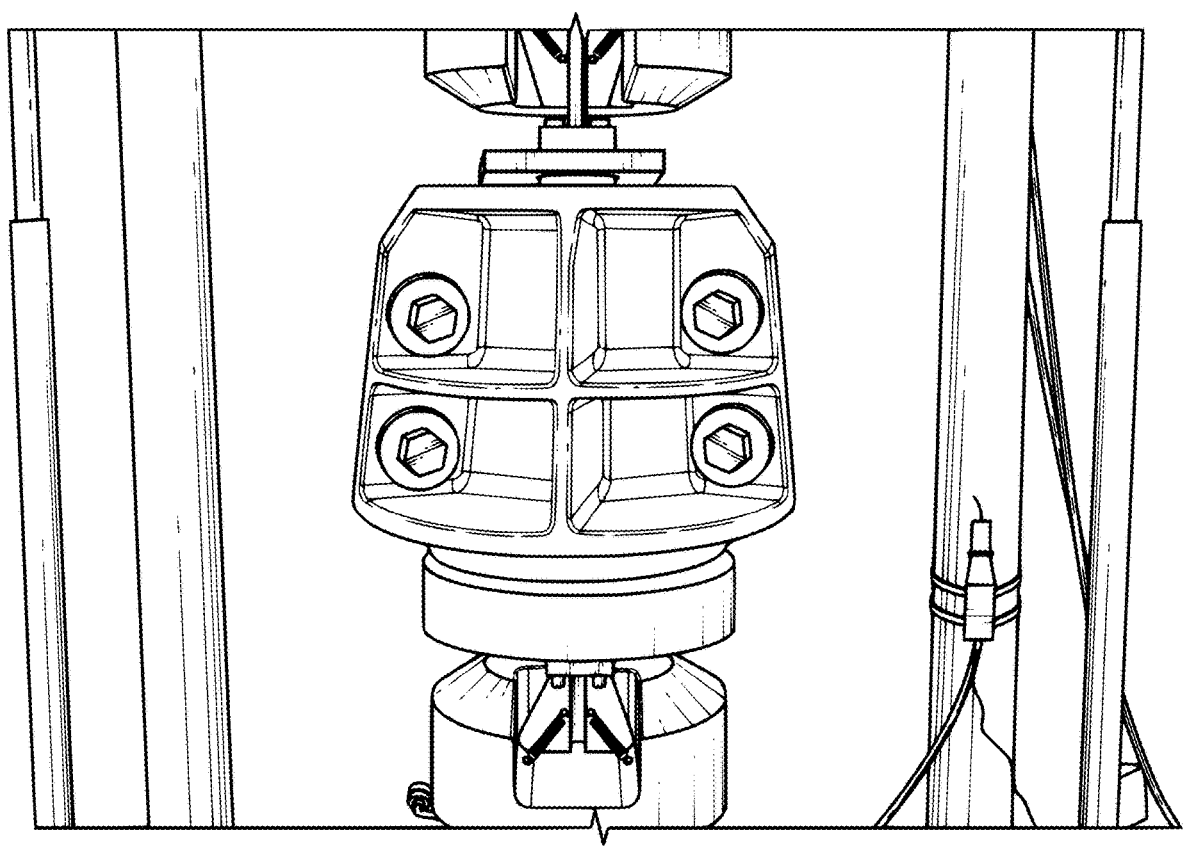
FIG. 11 shows an example slip test assembly for stop collar slip testing.

A stop collar and section of drill pipe were used to measure the slip load under simulated operating conditions. Two collar halves of a stop collar were clamped directly onto a section of drill pipe section with steel bolts and nuts as shown in FIG. 11. The stop collar halves were shimmed with washers (later removed) during assembly so that the pipe protruded through the bottom of the stop collar and so that both halves were approximately flush with each other. Torque was applied to the four steel bolts either at room temperature or at elevated temperature using a Stanley Proto 50-250 ft-lbf micro adjustable torque wrench.

To test at 60° C., the entire clamp/pipe assembly was placed in a convection oven set to around 65° C. for at least 1 hour until equilibrium was achieved. A handheld pyrometer was used to verify temperature before and after the slip test. The mating surfaces of the clamp and pipe remained above 60° C. with the external surfaces at approximately 55° C. The assembly was loaded onto an MTS® load frame (capacity of 222 kN). Load was applied to the drill pipe at a rate of 0.01 in/min until the assembly could not resist an increasing load. A test matrix is given in Table 7-2.

Measurements were obtained of the bolt torque after the assembly was heated to operating temperature. The test assembly was removed from the oven. Torque was applied at approximately 75% of the set torque. If the bolt did not slip, the torque was increased 5 ft-lbf and re-torqued. When the bolt turned, the torque was recorded. The average of all four bolts is noted in Table 7-2 for Trials 11 and 14. The assembly was re-heated for 15 minutes before the final slip test.

TABLE 7-2

Test Matrix and Data for Stop Collar Slip Load Tests

| Trial | Condition | Torque (ft-lbf) | Test Temp. | Actual Torque | Sample ID | Max Load | Clamp Force | μ | $\mu_{ave}$ |
|---|---|---|---|---|---|---|---|---|---|
| 1 | As Molded | 120 | RT | | Nov. 30, 2012 #4 & #7 | 122 | 155 | 0.79 | 0.87 |
| 2 | As Molded | 120 | RT | | Nov. 30, 2012 #4 & #7 | 122 | 155 | 0.79 | |
| 3 | As Molded | 80 | RT | | Nov. 30, 2012 #4 & #7 | 87 | 102 | 0.86 | |
| 4 | As Molded | 50 | RT | | Nov. 30, 2012 #4 & #7 | 64 | 61 | 1.0 | |
| 5 | Sandblasted | 80 | RT | | Nov. 27, 2012 #1 & #3 RFID | 105 | 102 | 1.0 | 1.0 |
| 6 | Sandblasted | 100 | RT | | Nov. 27, 2012 #1 & #3 RFID | 130 | 128 | 1.0 | |
| 7 | Sandblasted | 120 | RT | | Nov. 27, 2012 #1 & #3 RFID | 153 | 155 | 0.98 | |
| 8 | Sandblasted | 80 | RT | | Nov. 30, 2012 #4 & #7 | 77 | 102 | 0.76 | 0.74 |
| 9 | Sandblasted | 100 | RT | | Nov. 30, 2012 #4 & #7 | 91 | 128 | 0.71 | |
| 10 | Sandblasted | 120 | RT | | Nov. 30, 2012 #4 & #7 | 115 | 155 | 0.74 | |
| 11 | Sandblasted | 120 | 60° C. | 90 | Nov. 30, 2012 #4 & #7 | 56 | 115 | 0.49 | 0.45 |
| 12 | Sandblasted | 120 | 60° C. | 120 | Nov. 30, 2012 #4 & #7 | 74 | 155 | 0.48 | |
| 13 | Sandblasted | 100 | 60° C. | 100 | Nov. 30, 2012 #4 & #7 | 56 | 128 | 0.43 | |

TABLE 7-2-continued

Test Matrix and Data for Stop Collar Slip Load Tests

| Trial | Condition | Torque (ft-lbf) | Test Temp. | Actual Torque | Sample ID | Max Load | Clamp Force | μ | μ$_{ave}$ |
|---|---|---|---|---|---|---|---|---|---|
| 14 | Sandblasted | 100 | 60° C. | 80 | Nov. 30, 2012 #4 & #7 | 43 | 102 | 0.42 | |
| 15 | Sandblasted | 100 | 60° C. | 100 | Nov. 30, 2012 #4 & #7 | 57 | 128 | 0.44 | |

Figure 12:
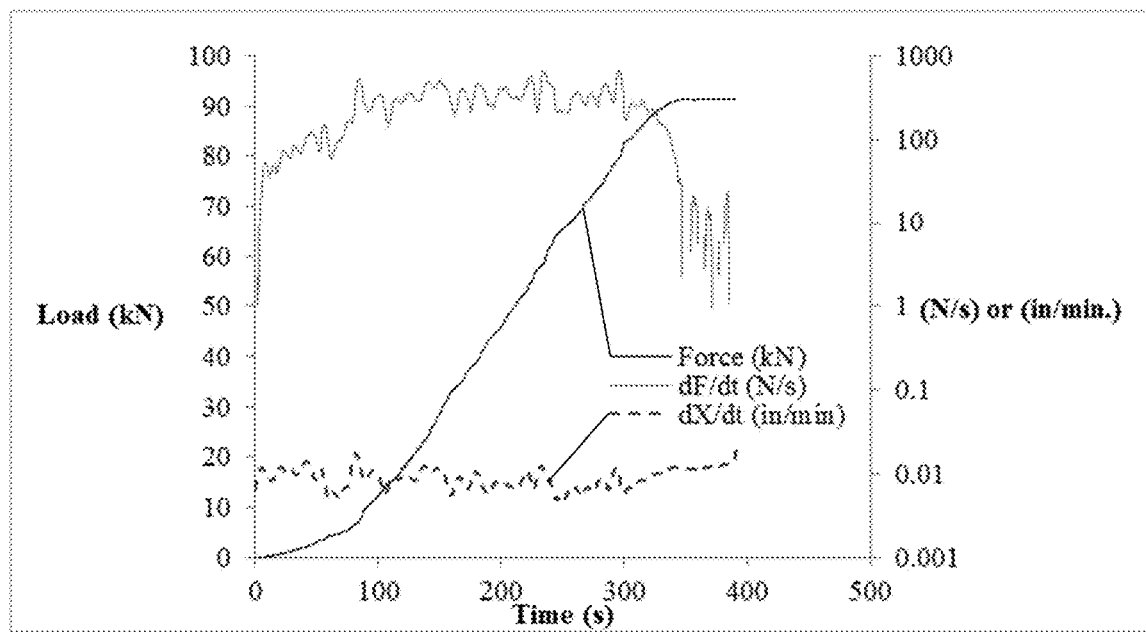
FIG. 12 illustrates an example load curve for stop collar slip tests according to various embodiments described herein.
Figure 13:
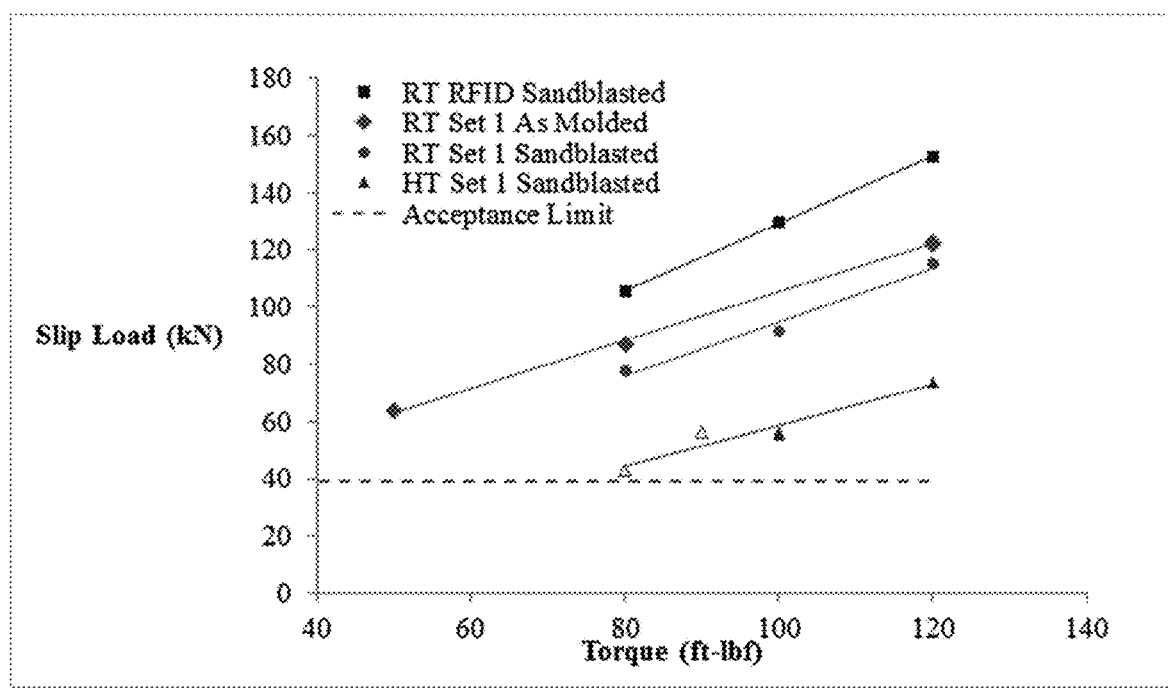
FIG. 13 illustrates data obtained during the stop collar slip tests according to various embodiments described herein.

Trials 11 and 14 in Table 7-2 show a drop in the apparent torque when the assembly temperature rises from room temperature to 60° C. The other elevated temperature trials were done after the assembly was re-torqued warm, immediately before the test. A typical load curve for a room temperature torque and test is shown in FIG. 12. There is an initial non-linear portion as the entire assembly settles. The slope steepens when both halves begin to be fully engaged. The load continues to climb linearly until the clamp slips. This is clearly marked as the sharp drop in incremental force dF/dt applied. If the stop collar was allowed to slip a sufficient distance, the slip load began to drop. A plot of the data obtained in the trials is shown in FIG. 13. In FIG. 13, the open symbols represent approximate torque after relaxation. An effective coefficient of friction was averaged for each run of testing conditions and is on the last column of Table 7-2 and is simply a ratio of slip load to clamping force (4*bolt preload).

Based on the testing and analysis presented above, the long glass fiber filled nylon 6,6 (PA66GL50) was found to have adequate properties to meet all the design requirements of the stop collar. FEA analysis performed on the optimized design resulted in a factor of safety of 2.61, as described in the APPENDIX, exceeding the 2.5 required. The long fiber thermoplastic (LFT) PA66 stop collar manufactured using the ECM process and tested under simulated performance condition exceeded the required slip load conditions. Even at a reduced torque of 100 ft-lbf at elevated temperature and not re-torqued, the slip load exceeded the required 40 kN.

Turning to testing for the stop collar hardware, a single hardware assembly to secure a stop collar includes 1× Stop Collar Bolt, 1× Top Stop Collar Nut (Flange Nut), QTY: 1× Bottom Stop Collar Nut (Locker Nut). For each stop collar (pair of collar halves) 4 hardware assemblies are required. Polymeric or polymer matrix composite materials, for example, are candidates for the stop collar hardware, and the stop collar hardware can be tested for compliance with requirements similar to that for the stop collars.

Additionally, the correlation between bolt torque and bolt tension can be experimentally determined and used to determine the appropriate thread friction coefficient for use in the flange clamping equations in API SPEC 6A, Annex D.

Figure 4:
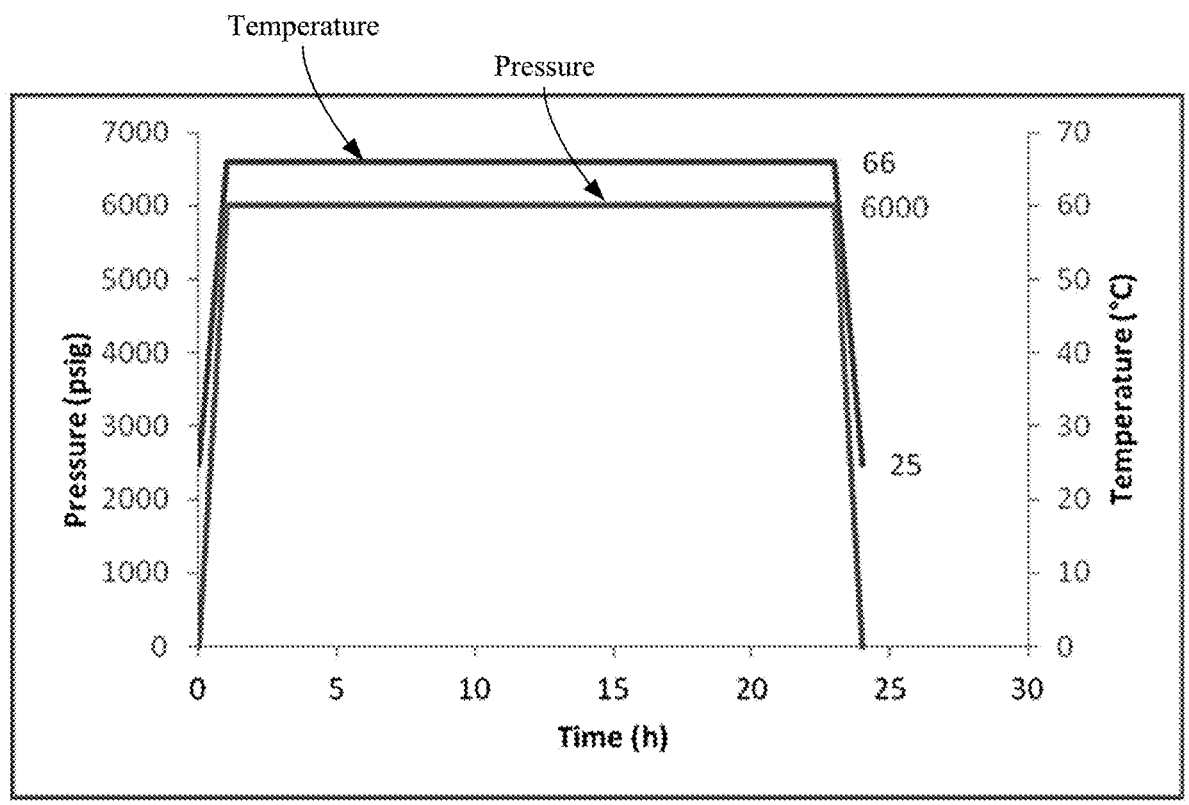
FIG. 4 illustrates an example aging cycle profile for testing components of the buoyancy solution according various embodiments described herein.

Prototype production bolts and nuts were exposed to pressurized synthetic (olefin) based mud (SBM) at 6000 psi at the maximum service temperature, followed by functionality evaluation as described above. The exposure was cyclic, consisting of 14 cycles to pressure and temperature, each cycle having a 24 hour duration as shown in FIG. 4.

Tension testing was performed with customized fixtures that allow axial loading of the bolt to occur through the threads, head, and shaft as would be the case when in service; a similar arrangement shall be used to load the threads and face of each type of nut. Axial applied load was continuously monitored in both tests as in a normal tensile test according to ASMT D638.

Torque testing and the determination of the relationship between torque and tension was also tested via a custom fixture which utilizes load cells, strain gauges, or linear variable differential transducers (LVDTs) to determine the axial tension and/or strain in the bolt shaft. Torque testing was via a calibrated precision torque wrench of suitable size to accurately measure torques in the range of 108.5-203.4 N-m. An example of the complete testing program is given in Table 8.

TABLE 8

Hardware Qualification Testing Summary

| Test | Condition | Lubricant | Tightening Mechanism | Test Temperature (° C.) | Samples | Acceptance Criteria |
|---|---|---|---|---|---|---|
| Bolt tensile failure | As received | No | NA | 23 | 3 | TBD |
| | | No | | 65 | 3 | |
| | Cyclically exposed | No | | 23 | 3 (1) | |
| | | No | | 65 | 3 (1) | |
| Thin nut tensile failure | As received | No | | 23 | 3 | |
| | | No | | 65 | 3 | |
| | Cyclically exposed | No | | 23 | 3 | |
| | | No | | 65 | 3 | |
| Thick nut tensile failure | As received | No | | 23 | 3 | |
| | | No | | 65 | 3 | |
| | Cyclically exposed | No | | 23 | 3 (1) | |
| | | No | | 65 | 3 (1) | |
| Assembly torque failure | As received | No | Impact wrench | 23 | 3 | TBD |
| | As received | No | Torque wrench | 23 | 3 | |
| | As received | Yes | Impact wrench | 23 | 3 | |
| | As received | Yes | Torque wrench | 23 | 3 | |
| | Cyclically exposed | No | Impact or torque, TBD based on results above | 23 | 3 | |
| | Cyclically exposed | Yes | | 23 | 3 | |

TABLE 8-continued

Hardware Qualification Testing Summary

| Test | Condition | Lubricant | Tightening Mechanism | Test Temperature (° C.) | Samples | Acceptance Criteria |
|---|---|---|---|---|---|---|
| Assembly Torque/Tension correlation | As received | No | Torque wrench | 23 | 3 | Determine relationship between tension and torque. Calculate friction coefficient (API 6A) |
| | As received | Yes | | | 3 | |
| | Cyclically exposed | No | | | 3 | |
| | Cyclically exposed | Yes | | | 3 | |

To conduct the testing, composite stop collar hardware was manufactured using ECM. The material used was a pigmented (black), 50% weight long chopped glass fiber reinforced polyphenylene sulphide (PPS). The stop collar hardware can also be formed from other LFT materials formed by hot melt-impregnating continuous reinforcing fiber into a thermoplastic resin. The mixture can be cooled and formed (e.g., chopped) into discontinuous reinforcing fiber pellets. The amount of thermoplastic resin can be about 40 to 99 weight % of the LFT material, and the amount of continuous reinforcing fiber (once cut into the discontinuous reinforcing fiber) can be approximately 0.1 to 60 weight % of the LFT material. Example thermoplastic resins include polyamide, acrylonitrile butadiene styrene (ABS), polyphenylene sulfide, polypropylene, poly ether ether ketone, poly ether ketone, polyethylene, poly butylene terephthalate, poly ethylene terephthalate, polyoxymethylene, or combinations thereof. Example reinforcing fibers include carbon, glass, aramid, polypropylene, polyethylene, basalt, poly{diimidazo pyridinylene (dihydroxy) phenylene}, or combinations thereof.

Figure 14:
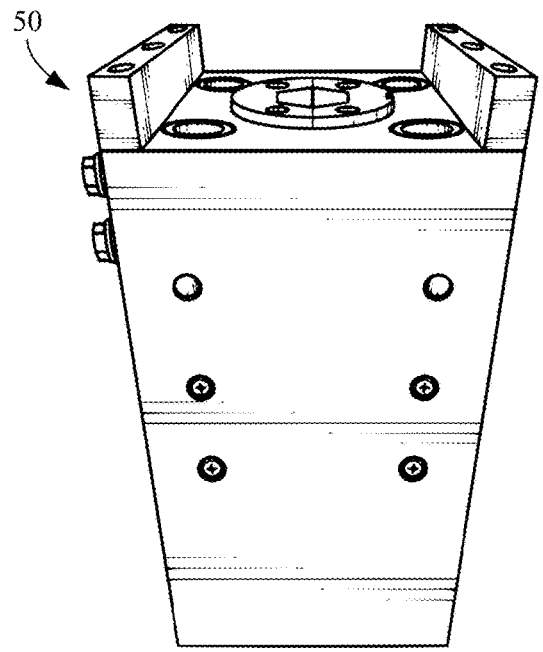
FIG. 14 shows a mold tool assembly for forming a single composite bolt, including the complete tool with collet, the closed collet, and the open collet according to various embodiments described herein.
Figure 14:
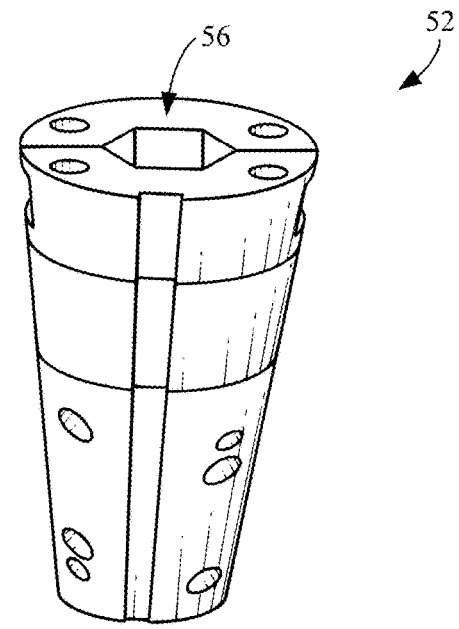
Figure 14:
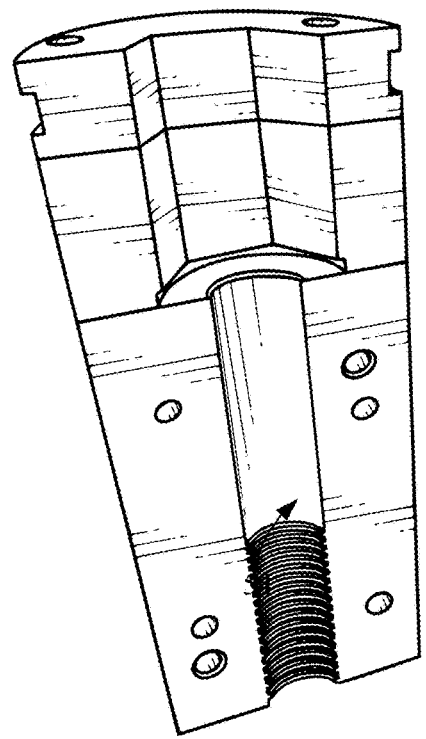

FIG. 14 shows a mold tool assembly for forming a single composite bolt using ECM. Particularly, FIG. 14 shows a complete mold tool 50 at (A), a collet 52 at (B) that fits inside the mold tool, and the open collet 52 at (C). The bolt mold tool 50 shown in FIG. 14 was designed to mold one bolt per cycle. As shown in FIG. 14, the collet 52 includes mold threading 54 to form the external threads of the bolt during extrusion-compression molding, although the mold tool assembly shown in FIG. 14 (or similar mold tools) can be used with injection molding, injection-compression molding, or other molding processes. The collet 52 also includes an opening 56 at the top end to allow for the flow of materials, such as thermoplastic, into the collet 52 during extrusion-compression molding processes. The bolt mold tool 50 and the collet 52 can be formed from any suitable material, such as steel or aluminum, using any suitable manufacturing techniques.

The bolt shown in FIG. 14 is similar to the bolt 31 shown in FIG. 3, and the bolt 31 can be formed in the collet 52 within the mold tool 50 using an extrusion-compression molding process. An example process of manufacturing the bolt 31 using the mold tool 50 and the collet 52 is described below with reference to FIG. 18.

Figure 15A:
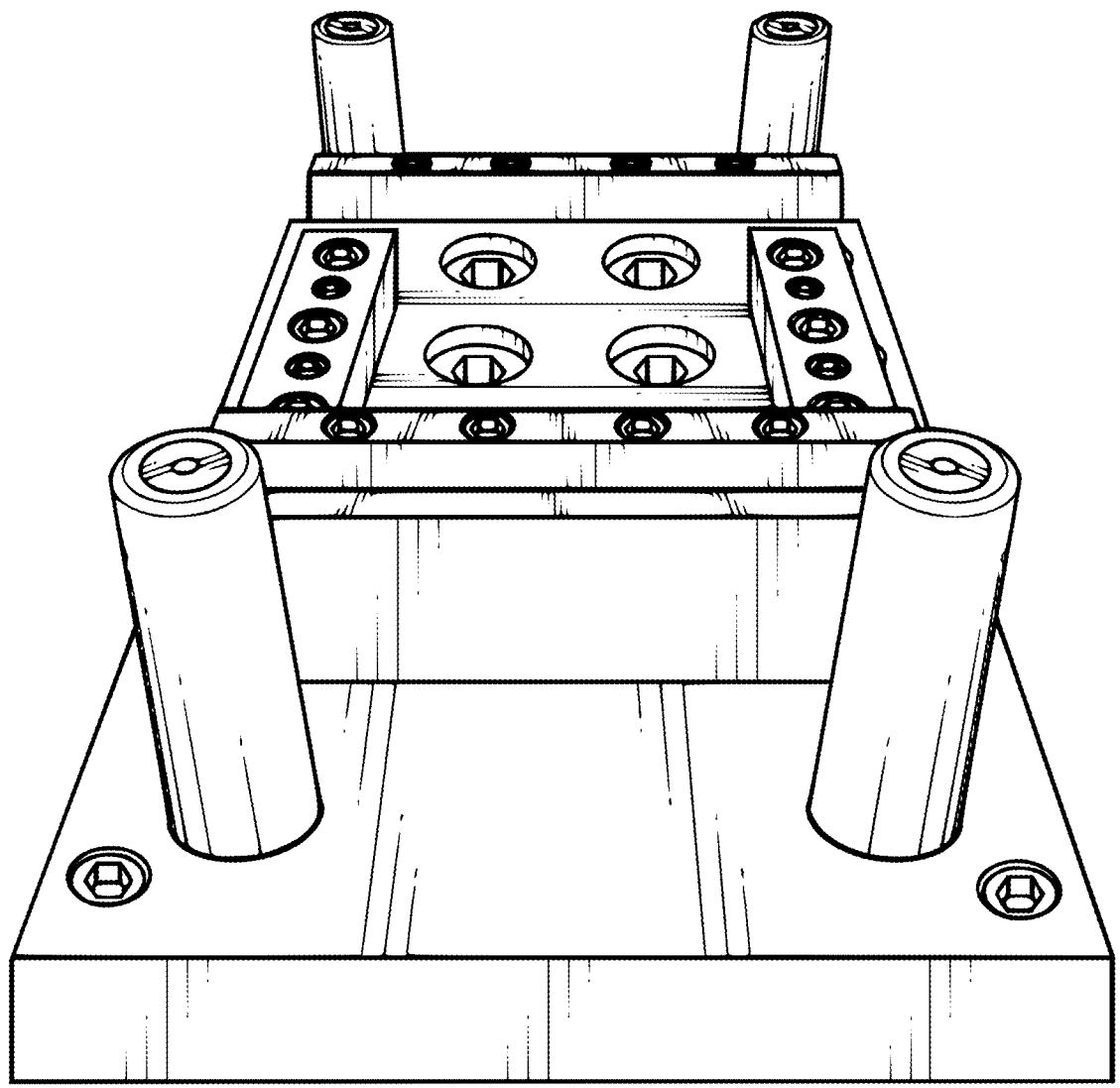
FIG. 15A shows a mold tool assembly for forming composite nuts and lock or jamb nuts according to various embodiments described herein.
Figure 15B:
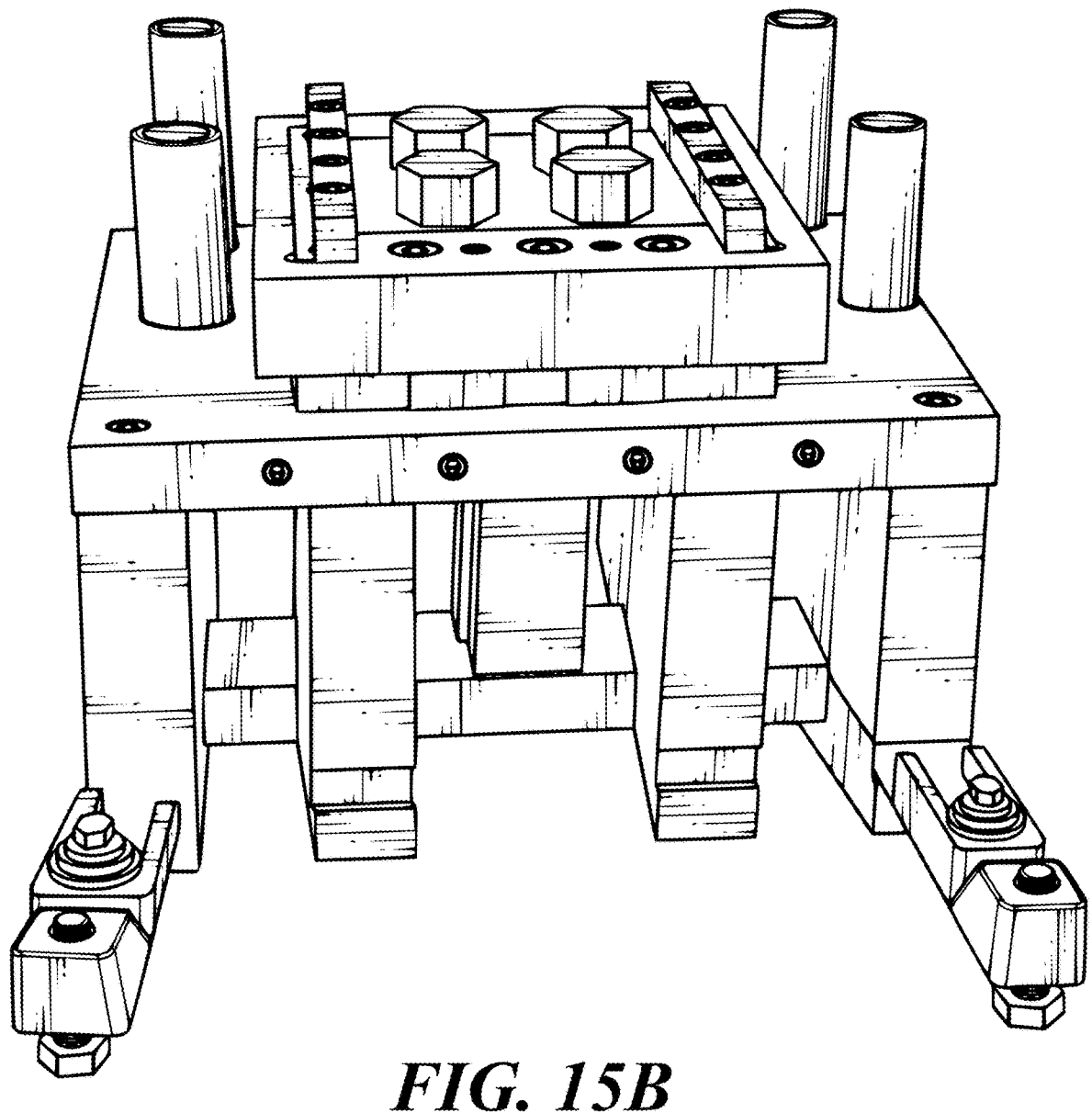
FIG. 15B further shows the mold tool assembly for forming composite nuts and lock or jamb nuts according to various embodiments described herein.

FIGS. 15A and 15B show a mold tool assembly for forming composite nuts and lock or jamb nuts. The mold tool shown in FIGS. 15A and 15B was designed to mold four nuts and four lock nuts per molding cycle. As shown in FIGS. 15A and 15B, bolts having an external bolt thread are inserted into the mold tool assembly to form the internal threads of the nuts during extrusion-compression molding, although the mold tool assembly shown in FIGS. 15A and 15B (or similar mold tools) can be used with injection molding, injection-compression molding, or other molding processes.

The bolts from the mold tool, an example of which is shown in FIG. 14, do not require any machining after they are formed. However, the molded part from the mold tool shown in FIGS. 15A and 15B is machined to arrive at the final nuts and lock nuts. The first operation is performed in order to cut the molded part into four quarters, since each single mold set consists of four top and bottom nuts. Second, each single quarter is cut vertically forming two parts, a nut and a lock nut. Third, the top of the nut upper surface is cut for the circular flange.

100% of the stop collar hardware parts were subjected to multiple visual inspections after production. All parts that showed visual signs of voiding, incomplete part fill, cracks, chips, or thread damage were rejected and excluded from the total count.

10% of normal production part assemblies were subjected for conformance to critical dimensions. All tested parts were found to be in conformance with tolerance below ±1/32 in (±0.8 mm). These same parts were also inspected for a complete hardware assembly fit-up. In addition, 100% of produced bolts were inspected for weight conformance. All accepted bolts are within the weight range of 227 g-230 g.

Figure 16:
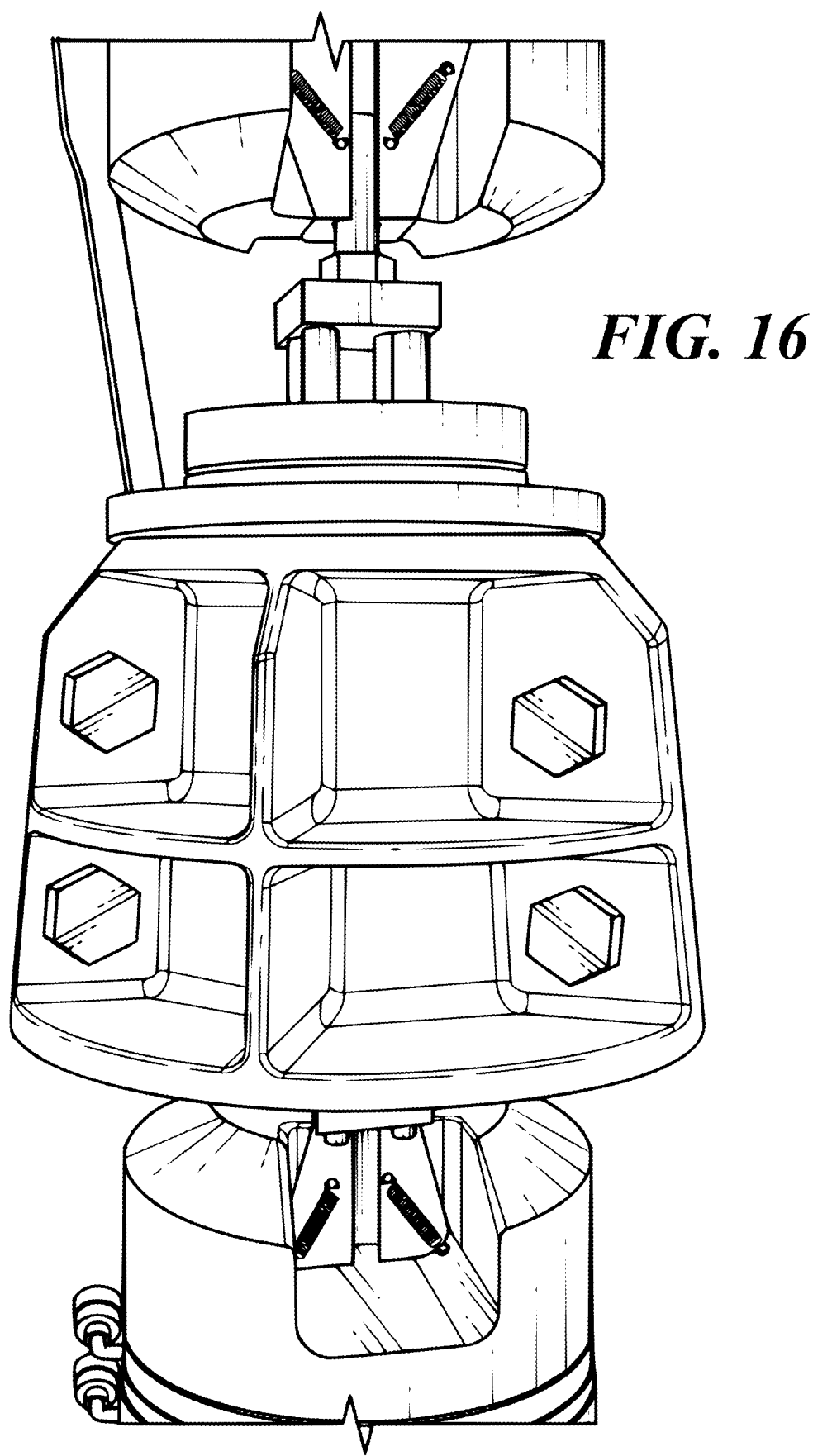
FIG. 16 shows an example test assembly for stop collar hardware torque testing.

Ten (10) hardware assemblies were subjected to torque testing. The torque testing test assembly is shown in FIG. 16. The torque testing consisted of the following steps:
1. Attach a pair of collar halves to a test pipe.
2. Screw four (4) complete hardware assemblies into the stop collar.
3. Torque each assembly until it reaches 120% of the designed torque, which is 65 lb. ft.

All tested assemblies passed the torque test without failure. It is of importance to state that in order to avoid failure completely, the lock nut should be screwed into the bolt and not the opposite.

To determine the tension load on each bolt, which is equivalent to the clamping force, the following test was performed:
1. Attach a pair of collar halves to a test pipe.
2. Screw four (4) steel bolts into the stop collar assembly and torque each bolt at 100 lb. ft.
3. Attach four (4) strain gages to one composite bolt.
4. Replace one steel bolt with the composite bolt with strain gages and torque it to 65 lb. ft.
5. Record strain reading.
6. Replace the steel bolts with composite bolts, one at a time, torque it at 65 lb. ft. and record strain readings.

Table 9 shows the strain data recorded during this testing and convert theses data into tension force.

TABLE 9

Clamp Force Readings During Strain Testing

| | Location | Torque (ft-lbs) | Averaged Strain for the 4 strain gages on the composite bolt (in/in) | Calculated tension load on the composite bolt with strain gages (kip) |
|---|---|---|---|---|
| Composite bolt with strain gages placed | Location 1 | 65 | 0.00158 | 3.212 |
| Diagonal steel bolt loosened | Location 4 | — | 0.00142 | 2.880 |
| Diagonal composite placed | Location 4 | 65 | 0.00142 | 2.884 |
| Steel bolt loosened | Location 2 | — | 0.00186 | 3.785 |
| Composite bolt placed | Location 2 | 65 | 0.00169 | 3.445 |
| Last steel bolt loosened | Location 3 | — | 0.00150 | 3.057 |
| Composite bolt placed | Location 3 | 65 | 0.00152 | 3.095 |

The mathematical relation between the applied torque on the bolts and the tension load on it is:

$$T = C_f DF$$

were T is the applied torque, $C_f$ is the coefficient of friction, D is the bolt nominal diameter, and F is the tension force on acting on the bolt.

Using this relation, it is possible to calculate the value for the coefficient of friction, $C_f$, based on the data obtained in Table 9.

$$C_f = \frac{T}{DF} = \frac{65 \text{ lb. ft}}{\left(\frac{1.8125}{12}\right) \text{ft. } (3.095 \times 1000) \text{ lb}} = 0.14$$

Figure 17:
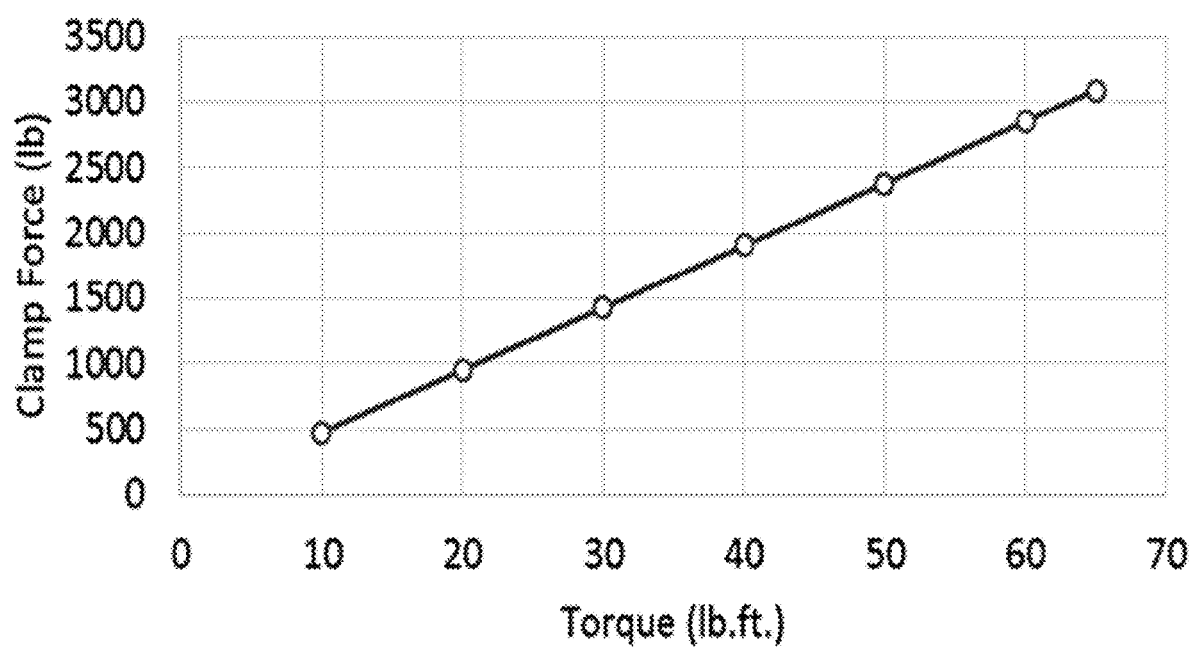
FIG. 17 illustrates a graph of clamping force versus applied bolt torque.

Based on the obtained parameters, a relation between the clamping force and the applied torque can be concluded as shown in FIG. 17.

In order to test the bolts behavior under slip conditions, four composite bolts were lubricated and torqued into the stop collar halves to 40 lb. ft. Then, a compressive load was applied into the stop collar. FIG. 16 shows the slip testing setup. No slip was observed with compressive load of 12 kip. However, there was a slight increase of bolt tension load (about 300 lb.) with the applied slip load.

Figure 18:
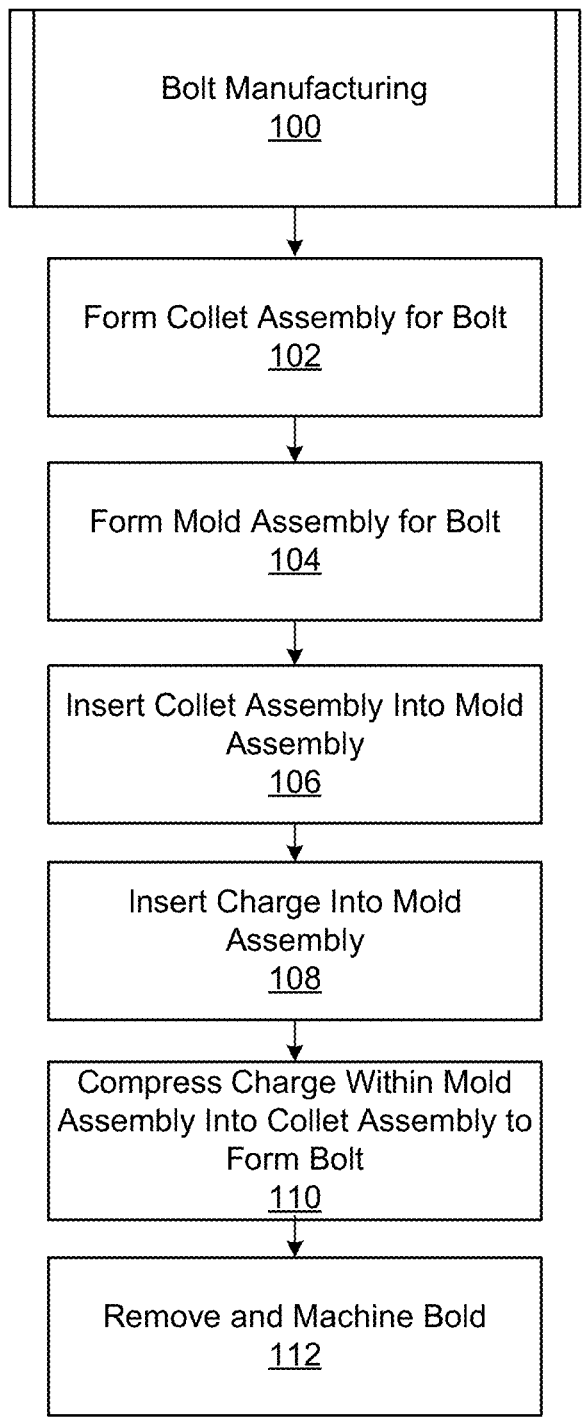
FIG. 18 illustrates a process for manufacturing a bolt of a fastening system according to various embodiments described herein.
Figure 19:
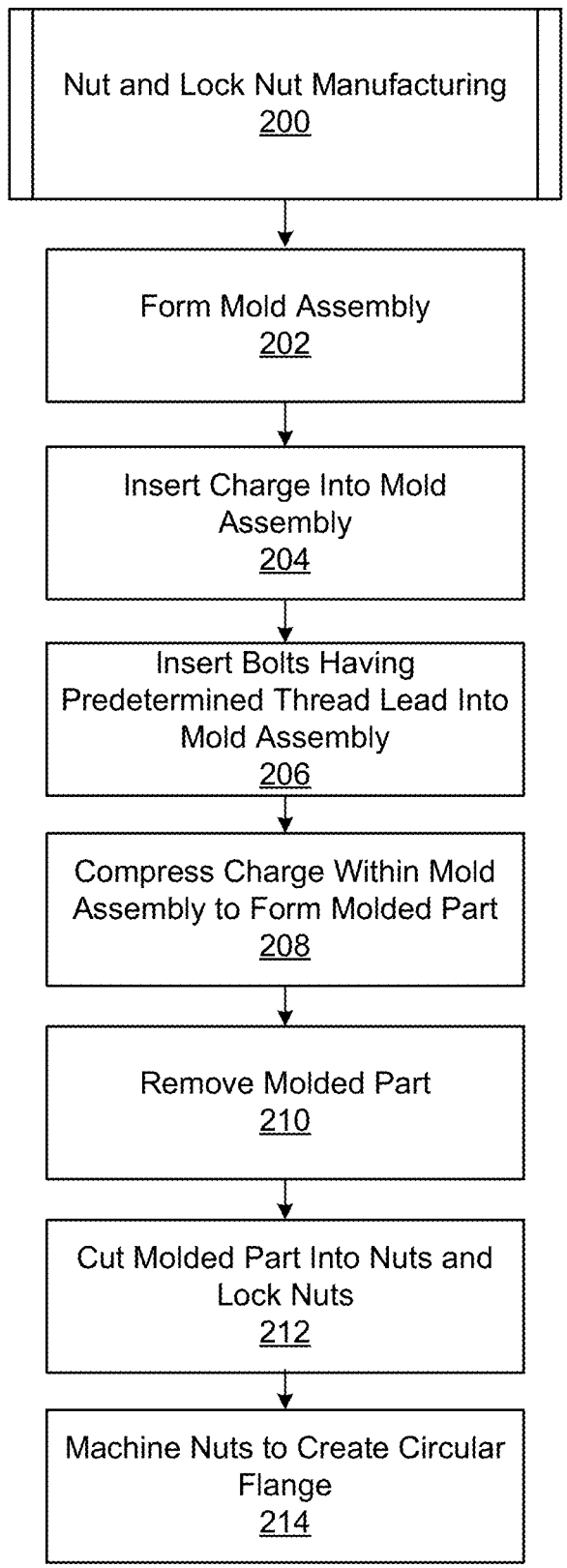
FIG. 19 illustrates a process for manufacturing nuts and lock nuts of a fastening system according to various embodiments described herein.

FIG. 18 illustrates a process 100 of manufacturing a bolt, and FIG. 19 illustrates a process 200 of manufacturing one or more nuts and lock nuts according to various embodiments described herein. Before turning to the steps shown in FIGS. 18 and 19, it is noted that the embodiments described herein may be practiced using an alternative order of the steps illustrated. That is, the process flows illustrated in FIGS. 18 and 19 are provided as examples only, and the embodiments may be practiced using process flows that differ from those illustrated. Additionally, not all steps are required in every embodiment. In other words, one or more of the steps may be omitted or replaced. Further, one or more of the steps may be performed in different orders, in parallel with one another, or omitted entirely, and/or certain additional steps may be performed.

Using the process 100, bolts similar the bolt 31 shown in FIG. 3 can be manufactured. At step 102, the process 100 includes forming a collet assembly for a bolt. An example of such a collet assembly is shown as the collet 52 in FIG. 14. The collet assembly can be formed from any suitable material, such as steel or aluminum, using any suitable manufacturing techniques. The collet assembly can include mold threading to form the external threads of the bolt being manufactured.

At step 104, the process 100 includes forming a mold assembly for the bolt. An example of such a mold assembly is shown as the mold tool 50 in FIG. 14. The mold assembly can be formed from any suitable material, such as steel or aluminum, using any suitable manufacturing techniques. During later processing steps, the collet assembly formed at step 102 can be placed inside the mold assembly formed at step 104.

At step 106, the process 100 includes inserting the collet assembly formed at step 102 inside the mold assembly formed at step 104. The purpose of the mold assembly at this point in the process is to secure the collet assembly for the molding process steps.

At step 108, the process 100 includes inserting a thermoplastic charge into the mold assembly. In various embodiments, the thermoplastic charge can include a long fiber thermoplastic, such as long glass fiber reinforced nylon 66, or the other materials identified herein as being suitable for the intended use of the bolt.

At step 110, the process includes compressing the thermoplastic charge within the mold assembly. The compressing at step 110 can be performed using a ram to press the thermoplastic charge into the mold assembly and the collet assembly. The compressing can also be performed with the application of heat to one or more of the ram, the mold assembly, and the collet assembly to cause the thermoplastic charge to melt and flow into the collet assembly. When the thermoplastic charge flows into the collet assembly, it can cool to form a bolt similar to the bolt 31 shown in FIG. 3. Other molding processes can be used in other cases, such as injection molding and injection-compression molding.

At step 112, the process includes removing the collet assembly from the mold assembly, opening the collet assembly, and removing the bolt from the collet assembly. If necessary, the process can also include machining steps to remove excess thermoplastic material, remove rough edges, etc.

Turning to the process 200 shown in FIG. 19, at step 202, the process 200 includes forming a mold assembly for manufacturing nuts and lock nuts. An example of such a nut is shown as the composite nut 32 in FIG. 14, and an example of such a lock nut is shown as the composite lock or jamb nut 33 in FIG. 14. An example of the mold assembly formed at step 202 is shown in FIGS. 15A and 15B. The example mold can be relied upon to form a number of nuts and lock nuts at a time. The mold assembly can be formed from any suitable material, such as steel or aluminum, using any suitable manufacturing techniques.

At step 204, the process includes inserting a thermoplastic charge into the mold assembly. In various embodiments, the thermoplastic charge can include a long fiber thermoplastic, such as long glass fiber reinforced polyphenylene sulphide, or the other materials identified herein as being suitable for the intended use of the nuts and lock nuts.

At step 206, the process includes inserting one or more bolts having an external bolt thread of a predetermined thread lead for the nuts and the lock nuts into the mold assembly. The predetermined thread lead of the bolts can be the same as that formed into the collet at step 102 in FIG. 18 (i.e., as also shown as the mold threading 54 in FIG. 14). The bolts are inserted to form the internal thread of the nuts and the lock nuts during extrusion-compression molding process steps.

At step 208, the process includes compressing the thermoplastic charge within the mold assembly. The compressing at step 208 can be performed using a ram to press the thermoplastic charge into the mold assembly. The compressing can also be performed with the application of heat to one or both of the ram and the mold assembly to cause the thermoplastic charge to melt and flow into the form of the mold assembly. Once flowed into the form, the thermoplastic charge can cool as a molded part. Nuts and lock nuts similar to the the nut 32 and the lock or jamb nut 33 shown in FIG. 14 can be machined from the molded part. Other molding processes can be used in other cases, such as injection molding and injection-compression molding.

At step 210, the process includes removing the molded part from the mold assembly. As part of the removing, the bolts inserted at step 206 can be removed from the mold assembly, and the ram can be removed from the mold assembly.

At step 212, the process includes cutting the molded part removed from the mold assembly at step 210. The molded part can be cut using any suitable cutting tools and/or techniques, including saws, lathes, etc., or combinations thereof. As one example cutting sequence, step 212 can include cutting the molded part laterally through the threaded apertures. The threaded apertures are formed in the molded part around the bolts (which were inserted at step 206). Thus, the molded part can be cut laterally to form a nut molding and a lock nut molding. The nut molding can also be divided into a number of nuts, and the lock nut molding can be divided into a number of lock nuts. Thus, the process can also include dividing the nut molding between the threaded apertures to form a number of nuts, and dividing the lock nut molding between the threaded apertures to form a number of lock nuts. As an alternative cutting sequence, the molded part can be first cut between the threaded apertures to form a number of nut/lock nut molding pairs, and each nut/lock nut molding pair can then be cut laterally to separate the nut and the lock nut from each other.

At step 214, the process includes machining the nuts and/or the lock nuts, to the extent necessary. For example, the top nut upper surface can be machined to cut the circular flange. If necessary, the process can also include machining steps to remove excess thermoplastic material, remove rough edges, etc.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A fastening system, comprising:
a stop collar to be fitted and secured around a drill pipe at one end of a plurality of buoyancy modules placed along a longitudinal length of the drill pipe; and
stop collar hardware to secure the stop collar together around the drill pipe, the stop collar hardware comprising a bolt made of a long fiber thermoplastic, a nut made of a long fiber thermoplastic, and a lock nut made of a long fiber thermoplastic, the bolt having an external thread of a predetermined thread lead, the nut having an internal thread of the predetermined thread lead, and the lock nut having the internal thread of the predetermined thread lead.

2. The fastening system of claim 1, wherein the stop collar comprises two collar halves to be secured together around the drill pipe using the stop collar hardware.

3. The fastening system of claim 1, wherein the bolt is a molded bolt and the nut is a molded nut.

4. The fastening system of claim 3, wherein the bolt is made of a long glass fiber reinforced nylon 66 and the nut is made of a long glass fiber reinforced polyphenylene sulphide.

5. The fastening system of claim 1, wherein the stop collar comprises two collar halves to be secured together around the drill pipe using the bolt and the nut.

6. The fastening system of claim 1, wherein the stop collar is formed from long fiber thermoplastic.

\* \* \* \* \*